(12) United States Patent
Moore et al.

(10) Patent No.: US 7,742,048 B1
(45) Date of Patent: Jun. 22, 2010

(54) METHOD, SYSTEM, AND APPARATUS FOR CONVERTING NUMBERS BASED UPON SEMANTICALLY LABELED STRINGS

(75) Inventors: Thomas G. Moore, Duvall, WA (US); Mohamed A. Abbar, Redmond, WA (US); Nader G. Issa, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/154,630

(22) Filed: May 23, 2002

(51) Int. Cl.
*G06F 17/00* (2006.01)
*G06T 11/00* (2006.01)
*G06F 17/20* (2006.01)
*G06F 17/21* (2006.01)
*G06F 17/22* (2006.01)

(52) U.S. Cl. .................. 345/467; 715/200; 715/206; 715/230; 715/231; 715/233; 715/234; 715/235; 715/236; 715/237; 715/238; 715/239; 715/240; 715/241; 715/242; 715/243; 715/244; 715/254

(58) Field of Classification Search .................. 345/467, 345/468, 469, 469.1, 470, 472.3; 704/8; 707/6, 4, 513; 708/204, 605; 715/503, 530, 715/200–254
See application file for complete search history.

(56) References Cited

U.S. PATENT DOCUMENTS

| | | | |
|---|---|---|---|
| 4,674,065 A | 6/1987 | Lange et al. ................. 364/900 |
| 4,868,750 A | 9/1989 | Kucera et al. ............... 364/419 |
| 5,020,019 A | 5/1991 | Ogawa ....................... 364/900 |
| 5,128,865 A | 7/1992 | Sadler ........................ 364/419 |
| 5,159,552 A | 10/1992 | van Gasteren et al. ......... 704/1 |
| 5,267,155 A | 11/1993 | Buchanan et al. ...... 364/419.14 |
| 5,287,448 A | 2/1994 | Nicol et al. ................. 715/707 |
| 5,297,039 A | 3/1994 | Kanaegami et al. ............ 707/5 |
| 5,317,546 A | 5/1994 | Balch et al. .................... 368/9 |
| 5,337,233 A * | 8/1994 | Hofert et al. ................. 715/540 |

(Continued)

FOREIGN PATENT DOCUMENTS

CA    2 246 920 A1    3/2000

(Continued)

OTHER PUBLICATIONS

Technique for Automatically Correcting Words in Text; Karen Kukich;*ACM Comput. Surv.*, 24, 4 (Dec. 1992); pp. 377-439.

(Continued)

*Primary Examiner*—Jin-Cheng Wang
(74) *Attorney, Agent, or Firm*—Merchant & Gould

(57) ABSTRACT

A method, system, and apparatus are provided for converting numbers to text and to digit shapes expressed in different languages. When a string of text is entered into an application program, the string is analyzed to determine whether the string of text includes a number expressed using digits. If the string of text includes a number expressed using digits, the number is semantically labeled with schema information. When a selection is received of the number, a list of actions may be provided identifying conversion actions available for the number. One of the conversion options may then be selected resulting in the conversion of the selected number to text in one or more languages. A conversion option may also be selected for converting the number digits to digits expressed using other digit shapes. The converted number may then be inserted into the string of text to replace the selected number.

20 Claims, 13 Drawing Sheets

U.S. PATENT DOCUMENTS

| | | | | |
|---|---|---|---|---|
| 5,341,293 | A | 8/1994 | Vertelney et al. | 715/530 |
| 5,351,190 | A * | 9/1994 | Kondo | 704/8 |
| 5,386,564 | A | 1/1995 | Shearer et al. | 395/650 |
| 5,392,386 | A | 2/1995 | Chalas | 395/155 |
| 5,418,902 | A | 5/1995 | West et al. | 715/503 |
| 5,446,891 | A | 8/1995 | Kaplan et al. | 395/600 |
| 5,522,089 | A | 5/1996 | Kikinis et al. | 710/73 |
| 5,535,323 | A | 7/1996 | Miller et al. | 715/707 |
| 5,541,836 | A | 7/1996 | Church et al. | 364/419.07 |
| 5,546,521 | A | 8/1996 | Martinez | 715/711 |
| 5,581,684 | A | 12/1996 | Dudzik et al. | 715/708 |
| 5,596,700 | A | 1/1997 | Darnell et al. | 715/512 |
| 5,617,565 | A | 4/1997 | Augenbraun et al. | 395/604 |
| 5,625,783 | A | 4/1997 | Ezekiel et al. | 395/352 |
| 5,627,567 | A | 5/1997 | Davidson | 345/173 |
| 5,627,958 | A | 5/1997 | Potts et al. | 715/708 |
| 5,634,019 | A | 5/1997 | Koppolu et al. | 715/744 |
| 5,640,560 | A | 6/1997 | Smith | 395/615 |
| 5,657,259 | A * | 8/1997 | Davis et al. | 708/204 |
| 5,685,000 | A | 11/1997 | Cox | 704/9 |
| 5,708,825 | A | 1/1998 | Sotomayor | 395/762 |
| 5,715,415 | A | 2/1998 | Dazey et al. | 715/708 |
| 5,717,923 | A | 2/1998 | Dedrick | 395/613 |
| 5,752,022 | A | 5/1998 | Chiu et al. | 395/610 |
| 5,761,689 | A | 6/1998 | Rayson et al. | 707/533 |
| 5,764,794 | A | 6/1998 | Perlin | 382/186 |
| 5,765,156 | A | 6/1998 | Guzak et al. | 707/100 |
| 5,781,189 | A | 7/1998 | Holleran et al. | 715/826 |
| 5,781,904 | A | 7/1998 | Oren et al. | 707/100 |
| 5,794,257 | A | 8/1998 | Liu et al. | 707/501 |
| 5,799,068 | A | 8/1998 | Kikinis et al. | 379/93.06 |
| 5,802,253 | A | 9/1998 | Gross et al. | 395/51 |
| 5,802,262 | A | 9/1998 | Van De Vanter | 395/180 |
| 5,802,299 | A | 9/1998 | Logan et al. | 395/200.48 |
| 5,802,530 | A | 9/1998 | van Hoff | 707/513 |
| 5,805,911 | A | 9/1998 | Miller | 395/796 |
| 5,809,318 | A | 9/1998 | Rivette et al. | 715/512 |
| 5,815,830 | A | 9/1998 | Anthony | 707/6 |
| 5,818,447 | A | 10/1998 | Wolf et al. | 715/752 |
| 5,821,931 | A | 10/1998 | Berquist et al. | 715/784 |
| 5,822,539 | A | 10/1998 | van Hoff | 395/200.66 |
| 5,822,720 | A | 10/1998 | Bookman et al. | 704/3 |
| 5,826,025 | A | 10/1998 | Gramlich | 395/200.47 |
| 5,832,100 | A | 11/1998 | Lawton et al. | 382/100 |
| 5,845,077 | A | 12/1998 | Fawcett | 709/221 |
| 5,855,007 | A | 12/1998 | Jovicic et al. | 705/14 |
| 5,859,636 | A | 1/1999 | Pandit | 345/335 |
| 5,872,973 | A | 2/1999 | Mitchell et al. | 395/685 |
| 5,875,443 | A | 2/1999 | Nielsen | 707/2 |
| 5,877,757 | A | 3/1999 | Baldwin et al. | 715/705 |
| 5,884,266 | A | 3/1999 | Dvorak | 704/270.1 |
| 5,892,919 | A | 4/1999 | Nielsen | 395/200.58 |
| 5,893,073 | A | 4/1999 | Kasso et al. | 705/8 |
| 5,893,132 | A | 4/1999 | Huffman et al. | 715/201 |
| 5,895,461 | A | 4/1999 | De La Huerga et al. | 707/1 |
| 5,896,321 | A | 4/1999 | Miller et al. | 365/189.01 |
| 5,900,004 | A | 5/1999 | Gipson | 707/530 |
| 5,907,852 | A | 5/1999 | Yamada | 715/541 |
| 5,913,214 | A | 6/1999 | Madnick et al. | 707/10 |
| 5,920,859 | A | 7/1999 | Li | 707/5 |
| 5,924,099 | A | 7/1999 | Guzak et al. | 707/100 |
| 5,933,139 | A | 8/1999 | Feigner et al. | 715/708 |
| 5,933,140 | A | 8/1999 | Strahorn et al. | 715/712 |
| 5,933,498 | A | 8/1999 | Schneck et al. | 705/54 |
| 5,940,614 | A | 8/1999 | Allen et al. | 717/120 |
| 5,944,787 | A | 8/1999 | Zoken | 709/206 |
| 5,946,647 | A | 8/1999 | Miller et al. | 704/9 |
| 5,948,061 | A | 9/1999 | Merriman et al. | 709/219 |
| 5,956,681 | A | 9/1999 | Yamakita | 704/260 |
| 5,974,413 | A | 10/1999 | Beauregard et al. | 707/6 |
| 5,987,480 | A | 11/1999 | Donohue et al. | 715/501.1 |
| 5,991,719 | A * | 11/1999 | Yazaki et al. | 704/251 |
| 5,995,756 | A | 11/1999 | Hermann | 395/712 |
| 6,006,265 | A | 12/1999 | Rangan et al. | 709/226 |
| 6,006,279 | A | 12/1999 | Hayes | 719/328 |
| 6,014,616 | A | 1/2000 | Kim | 704/8 |
| 6,018,761 | A | 1/2000 | Uomini | 706/206 |
| 6,028,605 | A | 2/2000 | Conrad et al. | 345/354 |
| 6,029,135 | A | 2/2000 | Krasle | 704/275 |
| 6,029,171 | A | 2/2000 | Smiga et al. | 707/102 |
| 6,031,525 | A | 2/2000 | Perlin | 345/173 |
| 6,052,531 | A | 4/2000 | Waldin et al. | 717/170 |
| 6,061,516 | A | 5/2000 | Yoshikawa et al. | 395/702 |
| 6,067,087 | A | 5/2000 | Krauss et al. | 715/762 |
| 6,072,475 | A | 6/2000 | Van Ketwich | 345/173 |
| 6,073,090 | A | 6/2000 | Fortune et al. | 704/8 |
| 6,085,201 | A | 7/2000 | Tso | 707/505 |
| 6,088,711 | A | 7/2000 | Fein et al. | 715/523 |
| 6,092,074 | A | 7/2000 | Rodkin et al. | 707/102 |
| 6,108,640 | A | 8/2000 | Slotznick | 705/26 |
| 6,108,674 | A | 8/2000 | Murakami et al. | 707/515 |
| 6,112,209 | A | 8/2000 | Gusack | 707/101 |
| 6,121,968 | A | 9/2000 | Arcuri et al. | 345/352 |
| 6,122,647 | A | 9/2000 | Horowitz et al. | 707/513 |
| 6,126,306 | A * | 10/2000 | Ando | 708/605 |
| 6,137,911 | A | 10/2000 | Zhilyaev | 382/225 |
| 6,141,005 | A | 10/2000 | Hetherington et al. | 715/866 |
| 6,151,643 | A | 11/2000 | Cheng et al. | 710/36 |
| 6,154,738 | A | 11/2000 | Call | 707/4 |
| 6,167,469 | A | 12/2000 | Safai et al. | 710/62 |
| 6,167,523 | A | 12/2000 | Strong | 726/21 |
| 6,167,568 | A | 12/2000 | Gandel et al. | 717/176 |
| 6,173,316 | B1 | 1/2001 | De Boor et al. | 709/218 |
| 6,182,029 | B1 | 1/2001 | Friedman | 704/9 |
| 6,185,550 | B1 | 2/2001 | Snow et al. | 707/1 |
| 6,185,576 | B1 | 2/2001 | McIntosh | 707/200 |
| 6,199,046 | B1 * | 3/2001 | Heinzle et al. | 705/1 |
| 6,199,081 | B1 | 3/2001 | Meyerzon et al. | 715/513 |
| 6,208,338 | B1 | 3/2001 | Fischer et al. | 715/705 |
| 6,219,698 | B1 | 4/2001 | Iannucci et al. | 709/221 |
| 6,246,404 | B1 | 6/2001 | Feigner et al. | 715/708 |
| 6,262,728 | B1 | 7/2001 | Alexander | 345/440.1 |
| 6,272,074 | B1 | 8/2001 | Winner | 368/10 |
| 6,272,505 | B1 | 8/2001 | De La Huerga | 707/501 |
| 6,282,489 | B1 | 8/2001 | Bellesfield et al. | 701/201 |
| 6,291,785 | B1 | 9/2001 | Koga et al. | 209/584 |
| 6,292,768 | B1 * | 9/2001 | Chan | 704/1 |
| 6,295,061 | B1 | 9/2001 | Park et al. | 715/764 |
| 6,297,822 | B1 | 10/2001 | Feldman | 715/705 |
| 6,300,950 | B1 | 10/2001 | Clark et al. | 715/705 |
| 6,308,171 | B1 | 10/2001 | De La Huerga | 707/3 |
| 6,311,152 | B1 | 10/2001 | Bai et al. | 704/9 |
| 6,311,177 | B1 | 10/2001 | Dauerer et al. | 707/2 |
| 6,311,194 | B1 | 10/2001 | Sheth et al. | 707/505 |
| 6,320,496 | B1 | 11/2001 | Sokoler et al. | 340/470.1 |
| 6,323,853 | B1 | 11/2001 | Hedloy | 345/339 |
| 6,336,125 | B2 | 1/2002 | Noda et al. | 715/531 |
| 6,336,131 | B1 | 1/2002 | Wolfe et al. | 709/203 |
| 6,338,059 | B1 | 1/2002 | Field et al. | 707/4 |
| 6,339,436 | B1 | 1/2002 | Amro et al. | 715/714 |
| 6,339,755 | B1 | 1/2002 | Hetherington et al. | 704/8 |
| 6,347,398 | B1 | 2/2002 | Parthasarathy et al. | 717/170 |
| 6,349,295 | B1 | 2/2002 | Tedesco et al. | 707/3 |
| 6,353,926 | B1 | 3/2002 | Parthesarathy et al. | 717/11 |
| 6,381,742 | B2 | 4/2002 | Forbes et al. | 717/176 |
| 6,382,350 | B1 | 5/2002 | Jezewski et al. | 181/290 |
| 6,392,668 | B1 | 5/2002 | Murray | 715/38 |
| 6,396,515 | B1 | 5/2002 | Hetherington et al. | 715/762 |
| 6,401,067 | B2 | 6/2002 | Lewis et al. | 704/275 |
| 6,408,323 | B1 | 6/2002 | Kobayashi et al. | 709/100 |
| 6,413,100 | B1 | 7/2002 | Dickmeyer et al. | 434/322 |
| 6,415,304 | B1 | 7/2002 | Horvitz | 715/205 |
| 6,421,678 | B2 | 7/2002 | Smiga et al. | 707/102 |
| 6,424,979 | B1 | 7/2002 | Livingston et al. | 715/511 |

| Patent No. | Date | Inventor | Class |
|---|---|---|---|
| 6,434,567 B1 | 8/2002 | De La Huerga | 707/102 |
| 6,438,545 B1 | 8/2002 | Beauregard et al. | 707/6 |
| 6,441,753 B1 | 8/2002 | Montgomery | 341/34 |
| 6,442,545 B1 | 8/2002 | Feldman et al. | 707/8 |
| 6,442,591 B1 | 8/2002 | Haynes et al. | 709/206 |
| 6,456,304 B1 | 9/2002 | Anguilo et al. | 715/779 |
| 6,470,091 B2 | 10/2002 | Koga et al. | 382/101 |
| 6,473,069 B1 | 10/2002 | Gerpheide | 345/157 |
| 6,477,510 B1 | 11/2002 | Johnson | 705/30 |
| 6,480,860 B1 | 11/2002 | Monday | 707/102 |
| 6,493,006 B1 | 12/2002 | Gourdol et al. | 345/825 |
| 6,498,982 B2 | 12/2002 | Bellesfield et al. | 701/202 |
| 6,510,504 B2 | 1/2003 | Satyanarayanan | 711/170 |
| 6,516,321 B1 | 2/2003 | De La Huerga | 707/102 |
| 6,519,557 B1 | 2/2003 | Emens et al. | 704/8 |
| 6,519,603 B1 | 2/2003 | Bays et al. | 707/102 |
| 6,546,433 B1 | 4/2003 | Matheson | 709/318 |
| 6,553,385 B2 | 4/2003 | Johnson et al. | 707/104.1 |
| 6,556,972 B1 | 4/2003 | Bakis et al. | 704/277 |
| 6,556,984 B1 | 4/2003 | Zien | 707/2 |
| 6,564,264 B1 | 5/2003 | Creswell et al. | 709/245 |
| 6,571,241 B1 * | 5/2003 | Nosohara | 707/6 |
| 6,571,253 B1 | 5/2003 | Thompson et al. | 707/103 R |
| 6,591,260 B1 | 7/2003 | Schwarzhoff et al. | 707/2 |
| 6,595,342 B1 | 7/2003 | Maritzen et al. | 194/212 |
| 6,601,075 B1 | 7/2003 | Huang et al. | 707/104.1 |
| 6,604,099 B1 | 8/2003 | Chung et al. | 707/3 |
| 6,615,131 B1 | 9/2003 | Rennard et al. | 701/200 |
| 6,618,733 B1 | 9/2003 | White et al. | 707/103 |
| 6,622,140 B1 | 9/2003 | Kantrowitz | 707/5 |
| 6,623,527 B1 | 9/2003 | Hamzy | 715/513 |
| 6,625,581 B1 | 9/2003 | Perkowski | 705/27 |
| 6,629,079 B1 | 9/2003 | Spiegel et al. | 705/26 |
| 6,631,519 B1 | 10/2003 | Nicholson et al. | 717/169 |
| 6,636,880 B1 | 10/2003 | Bera | 708/206 |
| 6,643,650 B1 | 11/2003 | Slaughter et al. | 707/10 |
| 6,654,734 B1 | 11/2003 | Mani et al. | 707/2 |
| 6,654,932 B1 | 11/2003 | Bahrs et al. | 715/507 |
| 6,658,623 B1 | 12/2003 | Schilit et al. | 715/513 |
| 6,687,485 B2 | 2/2004 | Hopkins et al. | 434/350 |
| 6,694,307 B2 | 2/2004 | Julien | 707/3 |
| 6,697,824 B1 | 2/2004 | Bowman-Amuah | 707/229 |
| 6,697,837 B1 | 2/2004 | Rodov | 709/203 |
| 6,708,189 B1 | 3/2004 | Fitzsimons et al. | 707/205 |
| 6,715,144 B2 | 3/2004 | Daynes et al. | 717/174 |
| 6,717,593 B1 | 4/2004 | Jennings | 715/760 |
| 6,718,516 B1 | 4/2004 | Claussen et al. | 715/513 |
| 6,728,679 B1 | 4/2004 | Strubbe et al. | 704/270.1 |
| 6,732,090 B2 | 5/2004 | Shanahan et al. | 707/3 |
| 6,732,361 B1 | 5/2004 | Andreoli et al. | 719/313 |
| 6,741,994 B1 | 5/2004 | Kang et al. | 707/102 |
| 6,742,054 B1 | 5/2004 | Upton, IV | 710/6 |
| 6,745,208 B2 | 6/2004 | Berg et al. | 707/201 |
| 6,766,326 B1 | 7/2004 | Cena | 707/101 |
| 6,795,808 B1 | 9/2004 | Strubbe et al. | 704/275 |
| 6,802,061 B1 | 10/2004 | Parthasarathy et al. | 717/173 |
| 6,826,726 B2 | 11/2004 | Hsing et al. | 715/513 |
| 6,829,631 B1 | 12/2004 | Forman et al. | 709/202 |
| 6,857,103 B1 | 2/2005 | Wason | 715/709 |
| 6,859,908 B1 | 2/2005 | Clapper | 715/224 |
| 6,868,525 B1 | 3/2005 | Szabo | 715/738 |
| 6,874,125 B1 | 3/2005 | Carroll et al. | 715/705 |
| 6,874,143 B1 | 3/2005 | Murray et al. | 717/173 |
| 6,880,129 B1 | 4/2005 | Lee et al. | 715/763 |
| 6,883,137 B1 | 4/2005 | Girardot et al. | 715/513 |
| 6,898,604 B1 | 5/2005 | Ballinger et al. | 707/101 |
| 6,901,402 B1 | 5/2005 | Corston-Oliver et al. | 701/101 |
| 6,904,560 B1 | 6/2005 | Panda | 715/202 |
| 6,925,457 B2 | 8/2005 | Britton et al. | 707/1 |
| 6,925,470 B1 | 8/2005 | Sangudi et al. | 707/102 |
| 6,944,857 B1 | 9/2005 | Glaser et al. | 717/173 |
| 6,948,133 B2 | 9/2005 | Haley | 715/780 |
| 6,950,831 B2 | 9/2005 | Haley | 707/104.1 |
| 6,950,982 B1 | 9/2005 | Dourish | 715/512 |
| 6,957,385 B2 * | 10/2005 | Chan et al. | 715/504 |
| 6,963,867 B2 | 11/2005 | Ford et al. | 707/3 |
| 6,964,010 B1 | 11/2005 | Sharp | 715/507 |
| 6,975,983 B1 | 12/2005 | Fortescue et al. | 704/9 |
| 6,976,090 B2 | 12/2005 | Ben-Shaul et al. | 709/246 |
| 6,976,209 B1 | 12/2005 | Storisteanu et al. | 715/512 |
| 6,981,212 B1 | 12/2005 | Claussen et al. | 715/205 |
| 6,986,104 B2 * | 1/2006 | Green et al. | 715/523 |
| 6,990,654 B2 | 1/2006 | Carroll, Jr. | 717/109 |
| 7,003,522 B1 | 2/2006 | Reynar et al. | 707/10 |
| 7,013,289 B2 | 3/2006 | Horn et al. | 705/26 |
| 7,024,658 B1 | 4/2006 | Cohen et al. | 717/117 |
| 7,028,312 B1 | 4/2006 | Merrick et al. | 719/330 |
| 7,032,174 B2 | 4/2006 | Montero et al. | 715/257 |
| 7,039,859 B1 | 5/2006 | Sundaresan | 715/229 |
| 7,051,076 B2 | 5/2006 | Tsuchiya | 709/206 |
| 7,082,392 B1 | 7/2006 | Butler et al. | 704/233 |
| 7,100,115 B1 | 8/2006 | Yennaco | 715/748 |
| 7,113,976 B2 | 9/2006 | Watanabe | 709/206 |
| 7,146,564 B2 | 12/2006 | Kim et al. | 715/235 |
| 7,216,351 B1 | 5/2007 | Maes | 719/328 |
| 7,281,245 B2 | 10/2007 | Reynar et al. | 717/173 |
| 7,302,634 B2 | 11/2007 | Lucovsky et al. | 715/200 |
| 7,305,354 B2 | 12/2007 | Rodriguez et al. | |
| 7,421,645 B2 | 9/2008 | Reynar | 715/206 |
| 7,454,459 B1 | 11/2008 | Kapoor et al. | 709/203 |
| 2001/0029605 A1 | 10/2001 | Forbes et al. | 717/11 |
| 2001/0041328 A1 | 11/2001 | Fisher | 434/157 |
| 2001/0042098 A1 | 11/2001 | Gupta et al. | 709/206 |
| 2001/0049702 A1 | 12/2001 | Najmi | 707/513 |
| 2001/0056461 A1 | 12/2001 | Kampe et al. | 709/201 |
| 2002/0002590 A1 | 1/2002 | King et al. | 709/206 |
| 2002/0003469 A1 | 1/2002 | Gupta | 340/407.11 |
| 2002/0003898 A1 | 1/2002 | Wu | 382/187 |
| 2002/0004803 A1 | 1/2002 | Serebrennikov | 715/513 |
| 2002/0007309 A1 | 1/2002 | Reynar | 705/14 |
| 2002/0023113 A1 | 2/2002 | Hsing et al. | 707/513 |
| 2002/0023136 A1 | 2/2002 | Silver et al. | 709/206 |
| 2002/0026450 A1 | 2/2002 | Kuramochi | 707/104.1 |
| 2002/0029304 A1 | 3/2002 | Reynar et al. | 709/332 |
| 2002/0035581 A1 * | 3/2002 | Reynar et al. | 707/513 |
| 2002/0038180 A1 | 3/2002 | Bellesfield et al. | 701/202 |
| 2002/0065110 A1 | 5/2002 | Enns et al. | 455/566 |
| 2002/0065891 A1 | 5/2002 | Malik | 709/206 |
| 2002/0066073 A1 | 5/2002 | Lienhard et al. | 717/105 |
| 2002/0078222 A1 | 6/2002 | Compas et al. | 709/232 |
| 2002/0091803 A1 | 7/2002 | Imamura et al. | 709/220 |
| 2002/0099687 A1 | 7/2002 | Krishnaprasad et al. | 707/1 |
| 2002/0100036 A1 | 7/2002 | Moshir et al. | 717/173 |
| 2002/0103829 A1 | 8/2002 | Manning et al. | 707/513 |
| 2002/0104080 A1 | 8/2002 | Woodard et al. | 717/176 |
| 2002/0110225 A1 | 8/2002 | Cullis | 379/67.1 |
| 2002/0111928 A1 | 8/2002 | Haddad | |
| 2002/0120685 A1 | 8/2002 | Srivastava et al. | 709/203 |
| 2002/0129107 A1 | 9/2002 | Loughran et al. | 709/206 |
| 2002/0133523 A1 | 9/2002 | Ambler et al. | 715/536 |
| 2002/0149601 A1 | 10/2002 | Rajarajan et al. | 345/619 |
| 2002/0156774 A1 | 10/2002 | Beauregard et al. | 707/3 |
| 2002/0156792 A1 | 10/2002 | Gombocz et al. | 707/100 |
| 2002/0169802 A1 | 11/2002 | Brewer et al. | 707/513 |
| 2002/0178008 A1 | 11/2002 | Reynar | 704/272 |
| 2002/0178182 A1 | 11/2002 | Wang et al. | 715/501.1 |
| 2002/0184247 A1 | 12/2002 | Jokela et al. | 707/204 |
| 2002/0188941 A1 | 12/2002 | Cicciarelli et al. | 717/175 |
| 2002/0196281 A1 | 12/2002 | Audleman et al. | 345/762 |
| 2002/0198909 A1 | 12/2002 | Huynh et al. | 707/513 |
| 2003/0002391 A1 | 1/2003 | Biggs | 368/82 |
| 2003/0005411 A1 | 1/2003 | Gerken | 717/120 |
| 2003/0009489 A1 | 1/2003 | Griffin | 707/500 |
| 2003/0014745 A1 | 1/2003 | Mah et al. | 717/170 |
| 2003/0025728 A1 | 2/2003 | Ebbo et al. | 345/744 |
| 2003/0046316 A1 | 3/2003 | Gergic et al. | 707/513 |

| | | |
|---|---|---|
| 2003/0050911 A1 | 3/2003 | Lucovsky et al. ............... 707/1 |
| 2003/0051236 A1 | 3/2003 | Pace et al. .................. 717/177 |
| 2003/0056207 A1 | 3/2003 | Fischer et al. ............... 717/174 |
| 2003/0081791 A1 | 5/2003 | Erickson et al. ............. 380/282 |
| 2003/0083910 A1 | 5/2003 | Sayal et al. ..................... 705/7 |
| 2003/0084138 A1 | 5/2003 | Tavis et al. .................. 709/223 |
| 2003/0097318 A1 | 5/2003 | Yu et al. ........................ 705/35 |
| 2003/0101190 A1 | 5/2003 | Horvitz et al. .............. 707/100 |
| 2003/0101204 A1 | 5/2003 | Watson ....................... 708/106 |
| 2003/0101416 A1 | 5/2003 | McInnes et al. ............. 715/513 |
| 2003/0106040 A1 | 6/2003 | Rubin et al. ................. 717/106 |
| 2003/0115039 A1 | 6/2003 | Wang ............................. 704/4 |
| 2003/0121033 A1 | 6/2003 | Peev et al. ................... 717/175 |
| 2003/0126136 A1 | 7/2003 | Omoigui ...................... 707/10 |
| 2003/0140308 A1 | 7/2003 | Murthy et al. ............... 715/500 |
| 2003/0154144 A1 | 8/2003 | Pokorny et al. ............... 705/28 |
| 2003/0158841 A1 | 8/2003 | Britton et al. .................. 707/3 |
| 2003/0158851 A1 | 8/2003 | Britton et al. ............... 707/100 |
| 2003/0167445 A1 | 9/2003 | Su et al. ...................... 715/513 |
| 2003/0172343 A1 | 9/2003 | Leymaster et al. .......... 715/500 |
| 2003/0177341 A1 | 9/2003 | Devillers .................... 712/227 |
| 2003/0182391 A1 | 9/2003 | Leber et al. ................. 709/217 |
| 2003/0192040 A1 | 10/2003 | Vaughan ..................... 717/173 |
| 2003/0195937 A1 | 10/2003 | Kircher et al. .............. 709/207 |
| 2003/0212527 A1* | 11/2003 | Moore et al. ................ 702/179 |
| 2003/0220795 A1 | 11/2003 | Araysantiparb et al. ..... 704/275 |
| 2003/0229593 A1 | 12/2003 | Raley et al. ................... 705/55 |
| 2003/0233330 A1 | 12/2003 | Raley et al. ................... 705/55 |
| 2004/0002939 A1 | 1/2004 | Arora et al. .................... 707/1 |
| 2004/0003389 A1 | 1/2004 | Reynar et al. ............... 717/174 |
| 2004/0006564 A1 | 1/2004 | Lucovsky et al. ............. 707/10 |
| 2004/0006741 A1 | 1/2004 | Radja et al. ................. 715/513 |
| 2004/0024875 A1 | 2/2004 | Horvitz et al. .............. 709/226 |
| 2004/0039990 A1 | 2/2004 | Bakar et al. ................. 715/505 |
| 2004/0044959 A1 | 3/2004 | Shanmugasundaram et al. .......................... 715/513 |
| 2004/0068694 A1 | 4/2004 | Kaler et al. ................. 715/513 |
| 2004/0083218 A1 | 4/2004 | Feng ........................... 707/100 |
| 2004/0133846 A1 | 7/2004 | Khoshatefeh et al. ....... 715/500 |
| 2004/0143581 A1 | 7/2004 | Bohannon et al. ........... 707/100 |
| 2004/0165007 A1 | 8/2004 | Shafron ....................... 345/781 |
| 2004/0199861 A1 | 10/2004 | Lucovsky .................... 715/500 |
| 2004/0201867 A1 | 10/2004 | Katano ....................... 358/1.15 |
| 2004/0236717 A1 | 11/2004 | Demartini et al. ............... 707/1 |
| 2005/0050164 A1 | 3/2005 | Burd et al. ................... 709/217 |
| 2005/0055330 A1 | 3/2005 | Britton et al. ................... 707/1 |
| 2005/0094850 A1 | 5/2005 | Nakao ......................... 382/103 |
| 2005/0108195 A1 | 5/2005 | Yalovsky et al. ............... 707/1 |
| 2005/0120313 A1 | 6/2005 | Rudd et al. .................. 715/866 |
| 2005/0187926 A1 | 8/2005 | Britton et al. ................... 707/3 |
| 2006/0173674 A1 | 8/2006 | Nakajima et al. ............... 704/9 |

FOREIGN PATENT DOCUMENTS

| | | |
|---|---|---|
| CN | ZL 200410005390.8 | 10/2008 |
| EP | 0 364 180 A2 | 4/1990 |
| EP | 0481784 A2 | 4/1992 |
| EP | 0598511 A2 | 5/1994 |
| EP | 0872827 A2 | 10/1998 |
| EP | 0810520 B1 | 12/1998 |
| EP | 1093058 A1 | 4/2001 |
| EP | 1280068 A2 | 1/2003 |
| EP | 1361523 A2 | 11/2003 |
| EP | 1376392 A2 | 1/2004 |
| EP | 1 447 754 A1 | 8/2004 |
| EP | 1 425 966 A3 | 9/2004 |
| JP | 64-88771 | 4/1989 |
| JP | 05-174013 | 7/1993 |
| JP | 08-272662 | 10/1996 |
| JP | 09-138636 | 5/1997 |
| JP | 10-171827 | 6/1998 |
| JP | 2000-222394 | 8/2000 |
| JP | 2000-231566 | 8/2000 |
| JP | 2001-014303 | 1/2001 |
| JP | 2001-125994 | 5/2001 |
| JP | 2001-522112 | 11/2001 |
| JP | 2001-0350464 | 12/2001 |
| JP | 2002163250 A | 6/2002 |
| JP | 2003-141174 | 5/2003 |
| WO | WO 95/07510 A1 | 3/1995 |
| WO | WO 99/17240 A1 | 4/1999 |
| WO | WO 00/54174 A1 | 9/2000 |
| WO | WO 00/67117 | 11/2000 |
| WO | WO 00/73949 A1 | 12/2000 |
| WO | WO 01/18687 A1 | 3/2001 |
| WO | WO 01/37170 A2 | 5/2001 |
| WO | WO 01/86390 A2 | 11/2001 |
| WO | WO 02/99627 A1 | 1/2002 |
| WO | WO 02/15518 A2 | 2/2002 |
| WO | WO 02/42928 A1 | 5/2002 |
| WO | WO 2004/012099 A2 | 2/2004 |

OTHER PUBLICATIONS

Putting People First: Specifying Proper Names in Speech Interfaces, Matt Marx and Chris Schmandt; *Proceedings of the ACM Symposium on User Interface Software and Technology*; 1994; pp. 29-37.

Interface and execution models in the fluke kernel; Bryan Ford, Mike Hibler, Jay Lepreau, Roland McGrath and Patrick Tullman; *Proceedings of the third symposium on operating systems design and implementation*, (1999) p. 101-115.

Exploring the applications user-expertise assessment for intelligent interfaces; Michel C. Desmarais and Jiming Liu; *Proceedings of the conference on human factors in computing systems*, (1993) p. 308-313.

Future directions in user-computer interface software; James D. Foley; *Conference proceedings on organizational computer systems*, (1991) p. 289-297.

Human-computer interface development: concepts and systems for its management, H. Rex Hartson and Deborah Hix; *ACM Comput. Surv.* 1 (Mar. 1989) p. 5-92.

Integrating computer technology, people technology; strategies and case studies from Georgia Tech's Graphics, Visualization and Usability Center; Jim Foley; *Proceedings of the workshop on advanced visual interfaces*, (1994) p. 34-43.

Command management system for next-generation user input; M. Tsai, P. Reiher and G.J. Popek; *Proceedings of the seventh workshop on hottopics in operating systems*, (1999) p. 17984.

U.S. Appl. No. 09/818,157, filed Mar. 27, 2001, entitled "Automatically Adding Proper Names to a Database."

U.S. Appl. No. 09/841,265, filed Apr. 24, 2001, entitled "Method and System for Applying Input Mode Bias."

U.S. Appl. No. 09/841,266, filed Apr. 24, 2001, entitled "Method and System for Providing Electronic Commerce Actions Based on Semantically Labeled Strings."

U.S. Appl. No. 09/906,552, filed Jul. 16, 2001, entitled "Method and System for Providing Restricted Actions for Recognized Semantic Categories."

U.S. Appl. No. 09/906,467, filed Jul. 16, 2001, entitled "Application Program Interfaces for Semantically Labeling Strings and Providing Actions Based on Semantically Labeled Strings."

U.S. Appl. No. 09/907,418, filed Jul. 17, 2001, entitled "Method and System for Defining Semantic Categories and Actions."

U.S. Appl. No. 09/588,411, filed Jun. 6, 2000, entitled "Method and System for Semantically Labeling Strings and Providing Actions Based on Semantically Labeled Strings."

U.S. Appl. No. 10/141,712, filed May 9, 2002, entitled "Method, System, and Apparatus for Converting Dates Between Calendars and Languages Based Upon Semantically Labeled Strings."

U.S. Appl. No. 10/140,544, filed May 7, 2002, entitled "Method, System, and Apparatus for Converting Numbers Between Measurement Systems Based Upon Semantically Labeled Strings."

U.S. Appl. No. 10/155,680, filed May 23, 2002, entitled "Method, System, and Apparatus for Converting Currency Values Based Upon Semantically Labeled Strings."

U.S. Appl. No. 10/179,810, filed Jun. 25, 2002, entitled "Method, System, and Apparatus for Performing Custom Actions on Digital Content."
U.S. Appl. No. 10/178,680, filed Jun. 24, 2002, entitled "System and Method for Incorporating Smart Tags in Online Content."
U.S. Appl. No. 10/179,438, filed Jun. 25, 2002, entitled "Method and System for Dynamically Providing Actions Associated with Semantically Labeled Strings."
U.S. Appl. No. 10/184,298, filed Jun. 27, 2002, entitled "Method and System for Associating Actions with Semantic Labels in Electronic Documents."
P. Hewkin, "Smart tags-the distributed-memory revolution", IEE Review, Jun. 22, 1989, pp. 203-206.
U.S. Official Action dated Dec. 8, 2004 in U.S. Appl. No. 09/588,411.
U.S. Official Action dated Nov. 2, 2004 in U.S. Appl. No. 10/178,680.
U.S. Official Action dated Mar. 17, 2005 in U.S. Appl. No. 09/841,265.
U.S. Official Action dated Jun. 24, 2005 in U.S. Appl. No. 10/140,544.
U.S. Official Action dated Dec. 15, 2005 cited in U.S. Appl. No. 10/155,680.
U.S. Official Action dated Nov. 22, 2005 cited in U.S. Appl. No. 10/141,712.
U.S. Final Official Action dated Nov. 15, 2005 cited in U.S. Appl. No. 09/841,265.
U.S. Official Action dated Oct. 5, 2005 cited in U.S. Appl. No. 10/179,810.
Measuring Units Conversion Table—http://web.archie.org- 1997 Internet French Property, pp. 1-4.
IBM Technical Disclosure Bulletin, "National Language Support Enhancement for Culture-Specific Operations", Nov. 1, 1993, vol. 36, Issue II, pp. 629-638.
Towers, J. Tarin, Visual Quickstart Guide: Dreamweaver 2 for Windows and Macintosh, 1999, Peachpit Press, pp. 150-151.
Driza, Scott, "Learn Word 2000 VBA Document Automation", Wordware Publishing Inc., 2001, 6 pp.
Cornell, Paul, "Developing Smart Tag DLLs", MSDN Library, http://msdn.microsoft.com/library/default.asp?url=/library/en-us/dnsmarttag/html/odc_smarttags.asp, Apr. 2001, pp. 8.
U.S. Appl. No. 10/183,317, filed Jun. 25, 2002, entitled "System and Method for Issuing a Message to a Program", Inventors: Sawicki et al.
U.S. Official Action dated Mar. 17, 2005 cited in U.S. Appl. No. 09/841,265.
U.S. Official Action dated Dec. 8, 2004 cited in U.S. Appl. No. 09/588,411.
U.S. Official Action dated Jul. 25, 2005 cited in U.S. Appl. No. 10/179,438.
U.S. Appl. No. 10/164,960, filed Jun. 6, 2002, entitled "Providing Contextually Sensitive Actions and Help Content in Computer-Generated Documents".
U.S. Appl. No. 10/164,260, filed Jun. 5, 2002, entitled "Mechanism for Downloading Software Components from a Remote Source for Use by a Local Software Application".
U.S. Appl. No. 10/731,899, filed Dec. 9, 2003, entitled "Mechanism for Downloading Components Associated with XML Documents and Smart Documents".
U.S. Appl. No. 10/366,141, filed Feb. 13, 2003, entitled "Linking Elements of a Document to Corresponding Fields, Queries and/or Procedures in a Database".
U.S. Appl. No. 10/377,258, filed Feb. 28, 2003, entitled "Method and System for Enhancing Paste Functionality of a Computer Software Application".
U.S. Appl. No. 10/608,267, filed Jun. 27,2003, entitled "Leveraging Markup Language Data for Semantically Labeling Text Strings and Data and for Providing Actions Based on Semantically Labeled Text Strings and Data".
U.S. Appl. No. 10/780,376, filed Feb. 17, 2004, entitled "Methods and Systems for Providing Automatic Actions on Recognized Text Strings in a Computer-Generated Document".
U.S. Appl. No. 10/184,190, filed Jun. 27, 2002, entitled "System and Method for Providing Namespace Related Information".
U.S. Official Action dated Apr. 8, 2005 cited in U.S. Appl. No. 10/164,960.
U.S. Official Action dated Apr. 19, 2005 cited in U.S. Appl. No. 09/841,266.
U.S. Official Action dated Jun. 6, 2005 in U.S. Appl. No. 10/164,260.
U.S. Official Action dated Sep. 2, 2005 cited in U.S. Appl. No. 10/366,141.
U.S. Official Action dated Oct. 20, 2005 cited in U.S. Appl. No. 09/906,552.
U.S. Official Action dated Nov. 2, 2005 cited in U.S. Appl. No. 10/184,190.
U.S. Official Action dated Nov. 10, 2005 cited in U.S. Appl. No. 10/164,260.
U.S. Official Action dated Dec. 14, 2005 cited in U.S. Appl. No. 10/608,267.
U.S. Official Action dated Jan. 11, 2006 in U.S. Appl. No. 09/841,266.
U.S. Official Action dated Jan. 17, 2006 in U.S. Appl. No. 10/140,544.
U.S. Official Action dated Feb. 2, 2006 in U.S. Appl. No. 09/906,467.
Menu Customizing, IBM Technical Disclosure Bulletin, vol. 34, No. 1, Jun. 1991, pp. 91-92 (4 pp. total).
Perry, Brad, et al., "Discovering Similar Resources by Content Park-Linking", Proceedings of the Sixth International Conference on Information and Knowledge Management, published by ACM Press 1997, pp. 317-324.
Schulz, Charles, "Writing Applications for Uniform Operation on a Mainframe or PC: A Metric Conversion Program", Lockheed Missles & Space Company, Inc., Sunnyvale, CA, May 1990, pp. 348-361.
Devanbue, P. et al., "Chime: customizable hyperlink insertion and maintenance engine for software engineering environments", Software Engineering, Publication date: 1999, ISBN: 1-58113-07400.
"Using Flyswat", http://www.flywsat.com/using.html, download date: Sep. 28, 1999, 1 pp.
"What is Flyswat", http://www.flyswat.com, download date: Sep. 28, 1999, 5 pp.
"Intelligent Text Processing: About", http://www.syntalex.co.uk/about/about.html, download date: Aug. 7, 1999, 1 pp.
"Intelligent Text Processing: Automatic Cross-Referencing", http://www.syntalex.co.uk/services/acrl.html, download date Aug. 7, 1999, 3 pp.
"Intelligent Text Processing: Case Study: Context", http://www.syntalex.co.uk/casestudies/context.html, download date: Aug. 7, 1999, 3 pp.
"Integrating with External Systems: iPlanet™ Unified Development Server", Sun Microsystems, Inc., Ver. 5.0, Aug. 2001, pp. 127-156.
Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.
Quin, Liam, "Extensible Markup Language (XML)", W3C Architecture Domain, http://web.archive.org/web/2002121962057/http://www.w3.org/XML/, 1996-2002, pp. 1-3.
Clark, James, and DeRose, Steve, "XML Path Language (XPath), Version 1.0", W3C, http://web.archive.org/web/2021010034434/http://www.w3.org/TR/xpath, 1999-2000, pp. 1-31.
"Microsoft BizTalk Server 2002—Using BizTalk Mapper", http://msdn.Microsoft.com/library/en-us/bts_2002/htm/lat_xmltools_map_intro_zkqb.asp..., Microsoft Corporation, 1999-2001, pp. 1-2.
"BizTalk Server 2002 Mapper User Interface", http://msdn.microsoft.com/library/en-us/bts_2002/htm/lat_xmltools_map_concept_codw..., Microsoft Corporation, 1999-2001, pp. 1.
"BizTalk Server 2002 Compiling Maps", http://msdn.microsoft.com/library/en-us/bts_2002/htm/lat_xmltools_map_concept_drgl.a..., Microsoft Corporation, 1999-2001, pp. 1.
"BizTalk Server 2002 Testing Maps", http://msdn.microsoft.com/library/en-us/bts_2002/htm/lat_xmltools_map_concept_fhhy.a..., Microsoft Corporation, 1999-2001, pp. 1-2.

"BizTalk Server 2002 View Links and Functoids By Using Grid Preview", http://msdn.microsoft.com/library/en-us/bts_2002/htm/lat_xmltools_map_check_fuwn.as..., Microsoft Corporation, 1999-2001, pp. 1.

"The StarOffice™ 6.0 Suite: New Features Guide", Sun Microsystems, V. 1.1, Jul. 2002, pp. 1-31.

"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.

"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Microsoft Unveils Visual Studio.NET Enterprise Tools", Microsoft Corporation, http://microsoft.com/presspass/press/2001/may01/05-21vseepr.mspx, May 2001, pp. 1-4.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"How to Use XSL to Transform Excel XML Spreadsheet for Server-Side Use", http://support.microsoft.com/default.aspx?scid=kb;en-us;278976, Microsoft Corporation, Aug. 2004, pp. 1-7.

Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.

M. Fernandez et al., "SilkRoute: trading between relations and XML", Computer Networks, vol. 33, No. 1-6, Jun. 2000, pp. 723-745.

V. Braganholo, "Updating Relational Databases Through XML Views", Technical Report, Sep. 2002, pp. 1-61.

G. Falquet et al., "Design and Analysis of Active Hypertext Views on Databases", Information Sciences Institute, Jan. 2002, pp. 1-24.

S. Ceri et al., "Deriving Production Rules for Incremental View Maintenance", Proceedings of the 17th International Conference on Very Large Data Bases, Sep. 1991, pp. 577-589.

A. Bonifati, "Active Behaviors within XML Document Management", EDBT Ph. D. Workshop, Mar. 2000, pp. 1-4.

"Integrated Development Enviorment (IDE)", http://web.archive.org/web/20020602032242/http:altova.com/products_ide.html, Jun. 2002, pp. 1-2.

Arbortext, "Arbortext and Accessibilty", http://web.archive.org/web/20021219133536/www.arbortext.com/html/accessibility.html, Dec. 2002, pp. 1-5.

Arbortext, "XML Compliance, 100% Pure XML", http:web.archive.org/web/20021209185855/www.arbortext.com/html/xml_compliance, Dec. 2002, pp. 1-3.

Arbortext, "Schemas", http://web.archive.org/web/20021221023148/www.arbortext.com/html/schemas.html, Dec. 2002, pp. 1-3.

Arbortext, "Arbortext's Support for XSL-FO", http://web.archive.org/web/20021221021632/www.arbortext.com/html/xsl-fo.html. Dec. 2002, pp. 1-4.

Corel, "Corel XMetal4, Making XML Content Creation Easy", http://web.archive.org/web/20031118215158/www.corel.com/servlet/Satellite?pagename, Nov. 2003, pp. 1-2.

Corel, "Corel XMetal 4 and Interwoven TeamXML", http://web.archive.org/web/20030807211225/www.corel.com/futuretense_cs/ccurl/corel+xml+4+and+interwoven+teamxml.pdf , Aug. 2003, pp. 1-2.

Corel, "The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.

Brooks-Bilson, "Programming ColdFusion" [electronic resource] 2001, Safari Tech Books Online, 1st Edition, 25 pp.

Wilker, John, "ColdFusion MX Adds J2EE, XML, and Web Services Compatibility", Aug. 9, 2002, http://builder.com/5102-6387-104585.html, 3 pp.

Homer, Alex et al., Professional Active Services Pages, 1997, Wrox Press Ltd., Section"Client-Side Scripting and Components", subsection "Choosing Your Applets, and Controls", 16 pp.

Flanagan, D., "JavaScript—The Definitive Guide, Fourth Edition", Jan. 2002, O'Reilly, 12 pp.

Brockschmidt, K., "Inside OLE, Second Edition", 1995, Microsoft Press, p. 169.

Toth, V., "Visual C++ 4 Unleashed", 1996, Sams Publishing, p. 174.

Sriram, V., "ComponentXchange: An E-Exchange for Software Components", Master Thesis, CitSccr, May 2001, pp. i-v, 1-77.

Bosak, "XML: The Universal Publishing Format", SGML/XML Europe '98, May 1998, pp. A1-C17.

Kristensen, "Template Resolution in XML/HTML", Computer Networks and ISDN Systems, vol. 30, 1998, pp. 239-249.

Fan et al., "FormPlus: A Form Authoring Toolkit", Proceedings of the Fourteenth Annual Computer Software and Applications Conference, Oct. 31, 1990-Nov. 2, 1990, pp. 255-260.

Boone, "Concept Features in Re: Agent, An Intelligent Email Agent", Proceedings of the 2nd International Conference on Autonomous Agents, May 9-13, 1998, pp. 141-148.

Takkinen et al., "CAFÉ: A Conceptual Model for Managing Information in Electronic Mail", Proceedings of the Annual Hawaii International Conference on System Sciences, 1998, pp. 44-53.

"Altova markup your mind!" http://web.archive.org/web/20021204211721/http://altova.com/products_ide.html, Dec. 2002, pp. 1-3.

"Smart Tags: Dumb Technology?", webreference.com, Online, Aug. 29, 2001, http://www.webreference.com/xml/column30/3.html, 3 pp.

"Being 'Smart' with Smart Tags in Office XP", Create for Mississippi, Aug. 2001, http://www.create.cett.msstate.edu/create/howto/smart_tags.pdf, 7 pp.

U.S. Official Action dated Dec. 29, 2003 in U.S. Appl. No. 09/588,411.

U.S. Official Action dated Mar. 29, 2004 in U.S. Appl. No. 09/906,552.

U.S. Official Action dated Jun. 14, 2004 in U.S. Appl. No. 09/588,411.

U.S. Official Action dated Jun. 18, 2004 in U.S. Appl. No. 09/818,157.

U.S. Official Action dated Jul. 15, 2004 in U.S. Appl. No. 09/906,467.

U.S. Official Action dated Aug. 20, 2004 in U.S. Appl. No. 09/841,266.

U.S. Official Action dated Sep. 29, 2004 in U.S. Appl. No. 09/907,418.

U.S. Official Action dated Oct. 6, 2004 in U.S. Appl. No. 09/818,157.

U.S. Official Action dated Jan. 25, 2005 in U.S. Appl. No. 09/906,552.

U.S. Official Action dated Mar. 1, 2005 in U.S. Appl. No. 09/818,157.

U.S. Official Action dated Mar. 24, 2005 in U.S. Appl. No. 10/141,712.

U.S. Official Action dated May 5, 2005 in U.S. Appl. No. 09/906,467.

U.S. Official Action dated May 6, 2005 in U.S. Appl. No. 09/907,418.

U.S. Official Action dated May 20, 2005 in U.S. 10/184,298.

U.S. Official Action dated Oct. 4, 2005 in U.S. Appl. No. 10/183,317.

U.S. Official Action dated Dec. 5, 2005 in U.S. Appl. No. 09/907,418.

U.S. Official Action dated Feb. 16, 2006 in U.S. Appl. No. 10/184,298.

Harold, E.R., "XML: Extensible Markup Language", IDG Books Worldwide, Books 24x7.com printout, 1998, 20 pp.

Marais, Hannes, "Supporting Cooperative and Personal Surfing With a Desktop Assistant", 1997, ACM Press, pp. 129-138.

U.S. Appl. No. 11/396,937, filed Apr. 3, 2006, entitled "Automatically Adding Proper Names to a Database".

U.S. Official Action dated Apr. 5, 2006 in U.S. Appl. No. 10/377,258.

U.S. Official Action dated Apr. 10, 2006 in U.S. Appl. No. 10/179,810.

U.S. Official Action dated Apr. 17, 2006 in U.S. Appl. No. 10/179,438.

U.S. Official Action dated Apr. 17, 2006 in U.S. Appl. No. 10/184,190.

U.S. Official Action dated May 26, 2006 in U.S. Appl. No. 09/588,411.

U.S. Official Action dated May 31, 2006 in U.S. Appl. No. 10/141,712.
U.S. Official Action dated Jun. 1, 2006 in U.S. Appl. No. 10/366,141.
U.S. Final Official Action dated Jul. 19, 2006 in U.S. Appl. No. 09/906,552.
U.S. Official Action dated Aug. 2, 2006 in U.S. Appl. No. 10/731,899.
U.S. Official Action dated Aug. 9, 2006 cited in U.S. Appl. No. 10/164,960.
U.S. Final Official Action dated Aug. 18, 2006 cited in U.S. Appl. No. 09/907,418.
U.S. Official Action dated Sep. 7, 2006 cited in U.S. Appl. No. 10/155,680.
U.S. Official Action dated Sep. 28, 2006 cited in U.S. Appl. No. 10/608,267.
U.S. Final Official Action dated Oct. 5, 2006 cited in U.S. Appl. No. 09/841,266.
U.S. Official Action dated Oct. 6, 2006 cited in U.S. Appl. No. 10/140,544.
U.S. Official Action dated Oct. 10, 2006 cited in U.S. Appl. No. 09/841,265.
European Communication dated Apr. 19, 2006 in EP 05 000 506.5-1527.
U.S. Final Office Action dated Oct. 19, 2006 cited in U.S. Appl. No. 09/906,467.
European Communication dated Sep. 25, 2006 in EP 03 01 4181.
World Wide Web Consortium, "Document Object Model (DOM) Level 2 Events Specification, Version 1.0", http://www.w3.org/TR/2000/REC-DOM-Level-2-Events-20001113/DOM2-Events.pdf, Nov. 2000, 50 pp.
World Wide Web Consortium, "Document Object Model (DOM) Level 2 Core Specification, Version 1.0", http://www.w3.org/TR/2000/REC-DOM-Level-2-Core-20001113/DOM2-Core.pdf, Nov. 2000, 107 pp.
U.S. Official Action dated May 14, 2007 cited in U.S. Appl. No. 09/906,552.
U.S. Final Office Action dated May 18, 2007 cited in U.S. Appl. No. 10/155,680.
U.S. Official Action dated May 30, 2007 cited in U.S. Appl. No. 09/906,467.
U.S. Final Official Action dated Jun. 15, 2007 cited in U.S. Appl. No. 10/751,899.
Blaheta et al., "Assigning Function Tags to Passed Test," Morgan Kaufmann Publishers Inc., 2000, pp. 234-240.
U.S. Final Official Action dated Dec. 26, 2006 in U.S. Appl. No. 10/179,810.
U.S. Official Action dated Jan. 5, 2007 in U.S. Appl. No. 10/183,717.
U.S. Official Action dated Jan. 11, 2007 in U.S. Appl. No. 10/184,190.
U.S. Official Action dated Jan. 25, 2007 in U.S. Appl. No. 10/608,267.
European Communication dated Nov. 17, 2006 in EP 03 011 851.7-2211.
European Communication dated Dec. 11, 2006 in EP 03 012 830.0-2211.
Singapore Search Report/Written Opinion dated Jan. 26, 2007 in SG 200500214-2.
U.S. Official Action dated Feb. 6, 2007 cited in U.S. Appl. No. 09/588,411.
U.S. Official Action dated Feb. 7, 2007 cited in U.S. Appl. No. 10/179,438.
U.S. Official Action dated Feb. 21, 2007 cited in U.S. Appl. No. 10/366,141.
European Communication dated Feb. 16, 2007 cited in European Application No. 04 003 683.2-2211.
Anonymous, "Adding Data from Other Sources in PowerPoint 2002," Jul. 2002, Internet article, XP-002420700, A Professional Approach Series the E-Zine Approach, http://www.glencoe.com/ps/computered/pas/article.php4?articleId-437, 8 pgs.
Rice, F.C., "Transform XML Files with XSLT When Importing into Microsoft Excel 2002," Jul. 2001, Internet article, XP-002420701, http://msdn2.microsoft.com/en-us/library/aa140055(office.10.d=printer).aspx, 9 pgs.
Johnson, L., "What's So Special About Paste Special?", Jun. 2002, Internet article, XP-002420702, http://pubs.logicalexpressions.com/Pub0009/LPMArticle.asp?ID=40, 5 pgs.
Anonymous, "Moving and Copying Text Tutorial," Aug. 17, 2001, Internet Article, XP-002307566, http://tutorials.findtutorials.com/read/category/102/id/342/p/3, 4 pgs.
U.S. Official Action dated Mar. 9, 2007 cited in U.S. Appl. No. 10/426,446.
U.S. Official Action dated Mar. 12, 2007 cited in U.S. Appl. No. 10/141,712.
U.S. Official Action dated Apr. 10, 2007 cited in U.S. Appl. No. 09/907,418.
"Word 2002 Add in: measurement Converter Smart Tag", http://www.microsoft.com/downloads/details.aspx?FamilyID=f67fc42c-5f4t-4c3f-9d5a-71354471dc32&DisplayLang=en, retrieved on Nov. 9, 2006, 2 pgs.
"Microsoft Measurement Converter Smart Tag—Chinese version", http://www.jiyang.gov/cn/laiying/My%20Pictures/%E8%B4%E5%BA%86%E8%BE%89/office2003/FILES/PFILES/COMMON/MSSHARED/SMARTTAG/CMEASURE/1033/CHMCABT.HTM, retrieved on Nov. 7, 2006, 2 pgs.
U.S. Office Action dated Nov. 9, 2006 cited in U.S Appl. No. 10/184,298.
U.S. Office Action dated Nov. 15, 2006 cited in U.S. Appl. No. 10/179,438.
U.S. Appl. No. 11/924,856, filed Oct. 26, 2007 entitled "Providing Contextually Sensitive Tools and Help Content in Computer-Generated Documents".
U.S. Office Action dated Oct. 9, 2007 cited in U.S. Appl. No. 10/183,317.
U.S. Final Office Action dated Oct. 16, 2007 cited in U.S. Appl. No. 09/907,418.
U.S. Office Action dated Oct. 17, 2007 cited in U.S. Appl. No. 10/155,680.
U.S. Final Office Action dated Oct. 19, 2007 cited in U.S. Appl. No. 10/184,190.
U.S. Final Office Action dated Oct. 19, 2007 cited in U.S. Appl. No. 09/588,411.
U.S. Final Office Action dated Oct. 19, 2007 cited in U.S. Appl. No. 10/141,712.
U.S. Final Office Action dated Oct. 30, 2007 cited in U.S. Appl. No. 09/906,552.
U.S. Final Office Action dated Dec. 26, 2007 cited in U.S. Appl. No. 09/841,265.
U.S. Office Action dated Dec. 26, 2007 cited in U.S. Appl. No. 10/377,258.
U.S. Final Office Action dated Jan. 7, 2008 cited in U.S. Appl. No. 10/179,438.
U.S. Final Office Action dated Jan. 9, 2008 cited in U.S. Appl. No. 09/906,467.
David D. Lewis et al., "A Sequential Algorithm for Training Text Classifiers," Spring-Verlag New York, Inc., 1994, pp. 1-10.
Russian Official Action dated Oct. 11, 2008 cited in Russian Application No. 2003118722.
Pershikov, V.I., "Explanatory Dictionary in Informatics," Finances and Statistics, Moscow, 1991 (in Russian with translated sections) 5 pgs.
U.S. Final Office Action dated Dec. 18, 2007 cited in U.S. Appl. No. 10/366,141.
European Communication dated Sep. 25, 2007 cited in European Application No. 03 014 181.6-1243.
Japanese Official Action dated Oct. 19, 2007 cited in Japanese Application No. 2003-128417.
Rubin, Charles, "Microsoft Word 2000 Official Manual," First Edition, Nikkei BP Soft Press, Inc., Aug. 2, 1999, pp. 215-217.
U.S. Final Office Action dated Dec. 7, 2007 cited in U.S. Appl. No. 10/426,446.
Malaysian Search Report dated Aug. 2, 2007 cited in Malaysian Application No. PI 20040265.
U.S. Office Action dated Sep. 27, 2007 cited in U.S. Appl. No. 10/608,267.
U.S. Office Action dated Jun. 28, 2007 cited in U.S. Appl. No. 09/841,266.

U.S. Final Office Action dated Jul. 12, 2007 cited in U.S. Appl. No. 10/184,298.

U.S. Office Action dated Jul. 20, 2007 cited in U.S. Appl. No. 09/841,265.

U.S. Final Office Action dated Jul. 26, 2007 cited in U.S. Appl. No. 10/164,960.

U.S. Office Action dated Aug. 10, 2007 cited in U.S. Appl. No. 10/179,810.

U.S. Office Action dated Sep. 10, 2007 cited in U.S. Appl. No. 10/179,438.

U.S. Office Action dated Jan. 25, 2008 cited in U.S. Appl. No. 10/608,267.

U.S. Office Action dated Feb. 8, 2008 cited in U.S. Appl. No. 10/141,712.

U.S. Office Action dated Feb. 15, 2008 cited in U.S. Appl. No. 10/731,899.

Singapore Examination Reported (conducted by Austrian Patent Office) dated Jan. 25, 2008 cited in SG Application No. 200500214-2.

Chinese Official Action dated Dec. 28, 2007 cited in Application No. 200410005390.8.

Chinese Official Action dated Jan. 4, 2008 cited in Application No. 200510009487.0.

Wei Ying-bin et al., "A New Technology ColdFusion of Realizing Dynamic Webpage," 2000, 6 pgs. (English language translation, pp. 1-6).

European Examination Report dated Mar. 4, 2006 cited in EP Application No. 02 014 717.9-1527.

European Examination Report dated Mar. 4, 2006 cited in EP Application No. 03 012 432.5-1527.

Russian Official Action dated Jan. 11, 2008 cited in Russian Application No. 2004105880/09(006292).

V. Doroth et al., "Modern Computer Vocabulary," St. Petersburg, BHV-Peterburg, 2001, p. 465 (with English language translation).

U.S. Official Action mailed Apr. 1, 2008 cited in U.S. Appl. No. 09/907,418.

U.S. Official Action mailed Apr. 4, 2008 cited in U.S. Appl. No. 10/155,680.

U.S. Official Action mailed Apr. 29, 2008 cited in U.S. Appl. No. 09/588,411.

U.S. Final Official Action mailed Apr. 29, 2008 cited in U.S. Appl. No. 10/179,810.

U.S. Official Action mailed May 1, 2008 cited in U.S. Appl. No. 10/183,317.

European Communication Summons to Attend Oral Proceedings dated Mar. 4, 2008 in EP 05 000 506.5-1527.

European Communication Summons to Attend Oral Proceedings dated Mar. 10, 2008 in EP 03 01 0292.5-1527.

Rubin, C., "Microsoft Word 2000 Official Manual", First Edition, Nikkei BP Soft Press, Inc., Aug. 2, 1999, pp. 215-217.

U.S. Office Action dated May 27, 2008 cited in U.S. Appl. No. 09/906,552.

U.S. Examiner's Answer BPAI dated Jun. 5, 2008 cited in U.S. Appl. No. 10/184,298.

U.S. Office Action dated Jun. 11, 2008 cited in U.S. Appl. No. 09/841,265.

U.S. Office Action dated Jun. 12, 2008 cited in U.S. Appl. No. 10/426,446.

U.S. Office Action dated Jun. 13, 2008 cited in U.S. Appl. No. 10/780,376.

U.S. Final Office Action dated Jun. 27, 2008 cited in U.S. Appl. No. 10/377,258.

M. Stowe, "XML in Excel and the Spreadsheet Component", Microsoft Corporation, Aug. 2001, 6 pgs.

C. Heinemann, "Cross-Reference your XML Data", Microsoft Corporation, Dec. 7, 1998, 6 pgs.

D. Obasanjo, "XML_Namespaces and How They Affect Xpath and XSLT", Microsoft Corporation, May 20, 2002, 19 pgs.

European Communication Summons to Attend Oral Proceedings dated May 7, 2008 cited in European Application No. 04002224.6.

Russian Official Action dated Mar. 13, 2008 cited in Russian Application No. 2004104096/09(004398).

Japanese Official Action dated Mar. 28, 2008 cited in Japanese Application No. 2003-178497.

Pixley, "Document Object Model (DOM) Level 2 Events Specification Version 1.0", World Wide Web Consortium, Nov. 13, 2000, www.w3.org/TR/2000/REC-DOM-Level-2-Events-20001113/DOM2-Events.pdf.

European Communication dated Jun. 3, 2008 cited in European Application No. 03 011 851.7-2211.

Japanese Official Action dated Apr. 18, 2008 cited in Japanese Application No. 2003-128417.

Polish Official Action dated Jun. 24, 2008 cited in Polish Application No. P 36553/DP.

"The Spatial Smart Tag", Geomatic Technologies, Mar. 10, 2005, 2 pp.

Harmon, D., "Microsoft MapPoint 2002", Geoworld Quick-Take Reviews, Aug. 2001, 3 pp.

Irie R. et al., "Resources for Place Name Analysis", May 28, 2004, 4 pp.

Rajabifard, A. et al., "Creating an Enabling Platform for the Delivery of Spatial Information", Spatial Sciences Institute Biennial Conference, Sep. 12, 2005, 10 pp.

Camarda, B., Special Editing Using® Microsoft® Office Word 2003, Que, Dec. 12, 2003, pp. 1-5.

Ivens, K., Office XP Smart Tags, Microsoft, Mar. 6, 2002, pp. 1-4.

Frye, C., Microsoft Office Systems: Step by Step, Microsoft Press, 2003 Edition, Sep. 3, 2003, pp. 1-6.

U.S. Official Action mailed Sep. 8, 2006 in U.S. Appl. No. 10/948,948.

U.S. Official Action mailed Feb. 15, 2007 in U.S. Appl. No. 10/948,948.

U.S. Official Action mailed Oct. 18, 2007 in U.S. Appl. No. 10/948,948.

U.S. Official Action mailed Mar. 20, 2008 in U.S. Appl. No. 10/948,948.

U.S. Official Action mailed Oct. 16, 2008 in U.S. Appl. No. 10/948,948.

European Search Report dated Dec. 12, 2006 in European Application No. 05 105 000.3-1527.

European Examination Report dated Oct. 9, 2007 in European Application No. 05 105 000.3-1527.

European Preliminary Opinion dated Aug. 27, 2008 cited in European Application No. 04002224.6-1527 / 1447754.

Chinese Official Action dated Dec. 7, 2007 in Chinese Application No. 200510088529.4.

Chinese Second Official Action dated Aug. 15, 2008 in Chinese Application No. 200510088529.4.

Chilean Second Office Action cited in Chilean Application No. 67-2005.

Malaysian Official Action dated Aug. 29, 2008 cited in Malaysian Application No. PI 20031902.

Polish Official Action dated Aug. 27, 2008 in Polish Application No. P360520.

Australian First Official Action dated Oct. 21, 2008 cited in Application No. 2003204800.

U.S. Final Office Action dated Dec. 24, 2008 cited in U.S. Appl. No. 09/841,265.

Sharon Oviatt et al., "Integration and Synchronization of Input Modes during Multimodal Human-Computer Interaction," CHI 97, Atlanta, Georgia, Mar. 22-27, 1997, pp. 415-422.

U.S. Office Action dated Dec. 23, 2008 cited in U.S. Appl. No. 10/179,810.

U.S. Office Action dated Jan. 5, 2009 cited in U.S. Appl. No. 10/141,712.

European Statement regarding Grounds of Appeal dated Jan. 13, 2009 cited in Application No. 04 002 224.6.

European Communication Minutes of Oral Proceedings and Decision dated Sep. 15, 2008 in European Application No. 05 000 506.5-1527.

Polish Second Official Action dated Oct. 28, 2008 in Polish Application No. P36553.

C.A.S. Santos, L.F.G. Soares, G.L. de Souza, and J.P. Courtiat, Design Methodology and Formal Validation of Hypermedia Documents, *Proceedings of the Sixth ACM International Conference on Multimedia*, (1998), p. 39-48.

Loren Terveen, Will Hill, and Brian Amento, Constructing, Organizing, and Visualizing Collections of Topically Related Web Resources, *ACM Transactions on Computer-Human Interaction*, vol. 6, No. 1, (Mar. 1999), p. 67-94.

Rob Barrett, Paul P. Maglio, and Daniel C. Kellem, How to Personalize the Web, *Conference Proceedings on Human Factors in Computing Systems*, (1997), p. 75-82.

Matthew Marx and Chris Schmandt, CLUES: Dynamic Personalized Message Filtering, *Proceedings of the ACM 1996 Conference on Computer Supported Cooperative Work*, (1996), p. 113-121.

Karl M. Goschka and Jurgen Falb, Dynamic Hyperlink Generation for Navigation in Relational Databases, *Proceedings of the Tenth ACM Conference on Hypertext and Hypermedia: Returning to Our Diverse Roots*, (1999), p. 23-24.

Alex Pentland, Perceptual User Interfaces: Perceptual Intelligence, *Commun. ACM*, 43, 3 (Mar. 2000), p. 35-44.

Mark A. Stairmand, Textual Context Analysis for Information Retrieval, *Proceedings of the 20th Annual International ACM SIGIR Conference on Research and Development in Information Retrieval*, (1997), p. 140-147.

Robert J. Glushko, Jay M. Tenebaum, and Bart Meltzer, An XML Framework for Agent-Based E-Commerce, *Commun. ACM* 42, 3 (Mar. 1999), p. 106.

Willisson, Pace, et al., "UNIX Man Pages: ispell," http://www.comp.lancs.ac.uk/computing/users/eiamjw/unix/chap8.html, http://www.physics.umn.edu/cgi-bin/man-cgi?spell, http://www.vorlesungen.uni-osnabrueck.de/informatik/shellscript/Html/Man/_Man_NeXT_html/html, http://duplex.hypermart.net/books.bsd/501-504.html, pp. 1-20.

Kuenning, Geoff, "International Ispell," Version 3.1.00, Oct. 8, 1993, http:// www.rt.com/man/findaffix.1.html, http://www.csee.usf.edu/cgi-bin/man-cig?ispell, http://fmg-www.cs.ucla.edu/geoff/ispell.html, pp. 1-33.

Kuenning, Geoff, "Ispell, v. 3.1," http://theochem.ki.ku.dk/on_line_docs/ispell/ispell_1.html, pp. 1-6.

"UNIX Man Pages: sed," http://www.calpoly.edu/cgi-bin/man-cgi?spell+1, pp. 1-14.

McMahon, Lee. E., "SED—A Non-Interactive Text Editor," Bell Laboratories, Murray Hill, New Jersey 07974, pp. 1-15.

Beitner, N. D.; Hall, W.; Goble, C.A., "Multimedia Support and Authoring in Microcosm: An Extended Model," Dept. of Electronics and Computer Science, Univ. of Southampton, Southampton SO17 1BJ, UK; Dept. of Computer Science, Univ. of Manchester, Oxford Road, Manchester M13 9PL, UK, pp. 1-12.

IBM Corporation, "IBM Research Disclosure #368; Multimedia Hyperlinks Automatically Created For Reference Documents," *IBM Technical Disclosure Bulletin*, Jun. 1993, pp. 1-5.

*The Complete LINUX™ Operating System 5.2 Deluxe*, Red Hat,® Macmillian Digital Publishing USA, A Viacom Company, Red Hat Software, Inc., ISBN 1-57595-199-1B, pp. 1-385.

*User Manual For AddressMate and AddressMate Plus*, CoStar Corporation, AddressMate Software, 1994-1995, pp. 1-210.

Getting Results With Microsoft® Office 97, *Real World Solutions For The Work You Do*, Microsoft Corporation, pp. 1-703.

*InfoCentral™ 7*, User's Manual, Corel Corporation, vol. 1, Version 7.0, 1996, pp. 1-86.

Corel® Office Professional 7 Quick Results User's Manual, vol. 1, Version 7.0 (first printing), Corel Corporation, Limited, pp. 1-531.

Novell GroupWise User's Guide for Windows 16-Bit Version 5.2, Novell, Inc., 1993-1997, pp. 1-231.

Novell GroupWise User's Guide for Windows 32-Bit Version 5.2, Novell, Inc., 1998, pp. 1-318.

Claris Em@iler Getting Started User's Guide, For Macintosh, Claris Corporation, 1995-1997.

Developer's Guide to Apple Data Detectors, for Version 1.0.2., Apple Computer, Inc., 1997, pp. 1-33.

Apple Data Detectors User's Manual, Apple Computer, Inc., 1997, pp. 1-15.

Nardi, Bonnie A.; Miller, James R.; Wright, David J., "Collaborative, Programmable Intelligent Agents," Jim Miller/Miramontes Computing, Apple Computer Advanced Technology Group, Mar. 1998, pp. 1-11.

Hara, T. et al., "Inside Microsoft.NET-Complete Explanation, 'What Microsoft Aims for'", msdn magazine, No. 6, pp. 20-35, ASII, Japan, Sep. 18, 2000, 19 pp.

Shiroiwa, K., "iMac&iBook, Must-see for User, Full of Recommended Setting Methods and Specially Selected Tips, Mastering Mac OS9", MacPeople, ASCII Corporation, Japan, Dec. 3, 1999, vol. 5, No. 24, p. 50 (in Japanese - no translation yet).

"Adding Data from Other Source in Power Point 2002" Internet Article, The McGraw-Hill Companies, Inc., Dec. 21, 2002, http://www.web.archive.org/web/20021221085214/ http://www.glencoe.com/ps/computered/pas/article.php4?articleID=437.

U.S. Final Office Action dated Jan. 22, 2009 cited in U.S. Appl. No. 10/366,141.

U.S. Office Action dated Feb. 4, 2009 cited in U.S. Appl. No. 10/377,258.

U.S. Final Office Action dated Mar. 4, 2009 cited in U.S. Appl. No. 10/780,376.

European Summons to Attend Oral Proceedings dated Feb. 26, 2009 cited in European Application No. 0301283.0/2211.

European Communication dated Mar. 18, 2009 cited in European Application No. 04003683.2-2211.

European Summons to Attend Oral Proceedings dated Mar. 20, 2009 cited in European Application No. 03012830.0.

Australian First Examiner's Report dated Sep. 15, 2008 cited in Australian Application No. 2003204379.

Japanese Final Official Action dated Nov. 25, 2008 cited in Japanese Application No. 2002-207514.

Japanese Official Action dated Feb. 6, 2009 cited in Japanese Application No. 2003-180218.

Japanese Official Action dated Feb. 13, 2009 cited in Japanese Application No. 2003-162911.

Japanese Official Action dated Feb. 24, 2009 cited in Japanese Application No. 2003-161338.

Japanese Official Action dated Mar. 6, 2009 cited in Japanese Application No. 2004-042140.

(Previously cited) Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53 (with English language translation).

Mexican Official Action dated Feb. 11, 2009 cited in Application No. PA/a/2003/005451.

Chinese Final Rejection dated Mar. 13, 2009 cited in Application No. 03145242.6.

Japanese Final Rejection dated Mar. 17, 2090 cited in Application No. 2004-037158.

Japanese Final Rejection dated Apr. 3, 2009 cited in Application No. 2002-207514.

C. Goldfarb, XML Handbook, $1^{st}$ Ed., Pearson Education, Japan, May 10, 1999, pp. 246-254 (No. English translation).

S. Tanaka, "Verifying the XML Schema Definition," XML Magazine, Shoeisha Co., Ltd., vol. 10, No. 3, Jul. 1, 2000, pp. 135-155 (No. English translation).

U.S. Office Action dated Apr. 20, 2009 cited in U.S. Appl. No. 10/426,446.

European Summons to Attend Oral Proceedings dated Aug. 5, 2009 cited in Application No. 03003931.7.

Japanese Official Action dated May 26, 2009 cited in Application No. 2005-039754.

Chinese Decision on Rejection dated Jul. 3, 2009 cited in Application No. 03143003.1.

Polish Official Action dated Aug. 25, 2009 cited in Application No. P 365553.

Australian Official Action dated Sep. 11, 2009 cited in Application No. 2003204478.

Norwegian Official Action dated Aug. 24, 2009 cited in Application No. 2003 2550.

Polish Official Notice dated Sep. 22, 2009 cited in Application No. P. 364854/DP.

Polish Official Notice dated Sep. 23, 2009 cited in Application No. P. 360520/DP.

Korean Official Action dated Sep. 30, 2009 cited in Application No. 10 2003-40988.

Japanese Official Notice of Final Rejection dated Oct. 2, 2009 cited in Application No. 2003-162911.

U.S. Office Action dated Oct. 22, 2009 cited in U.S. Appl. No. 10/377,258.

Japanese Official Notice of Final Rejection dated Oct. 27, 2009 cited in Application No. 2003-161338.

Russian Official Action dated Jun. 21, 2009 cited in Application No. 2005104223/09(005505).

D. Richter, "Windows for professionals" (Win32 API programming for Windows NT 3.5 and Windows 95, translation from English, Moscow: Russian Edition, 1995, ISBN 7502-0010-8, pp. 26, 31, 215.

U.S. Final Office Action dated Nov. 30, 2009 cited in U.S. Appl. No. 10/179,810.

Glover et al., "Inferring hierarchical Descriptions," ACM, 2002, pp. 507-514.

Malaysian Examination Report dated Nov. 30, 2009 cited in Application No. PI 20040559.

Australian Third Official Action dated Dec. 23, 2009 cited in Application No. 2003204478.

Australian First Official Action Report dated Jan. 18, 2009 cited in Application No. 2004200459 (60001.0211AU01).

* cited by examiner

دهوردرویست و سه
Eénhonderddrieëntwintig
One hundred twenty-three
Cent vingt-trois
Hundertdreiundzwanzig
מאה עשרים ושלוש
מאה עשרים ושלש
Centoventitré
Сто двадцать три
Etthundratjugotre
Yüzyirmiüç

METHOD, SYSTEM, AND APPARATUS FOR CONVERTING NUMBERS BASED UPON SEMANTICALLY LABELED STRINGS

TECHNICAL FIELD

Embodiments of the present invention relate to the field of number conversion. More particularly, embodiments of the invention relate to the field of converting numbers expressed using digits to text and to converting digit characters to different digit characters.

BACKGROUND OF THE INVENTION

Modern desktop operating systems are provided with various localization features for improving usability for users throughout the world. For instance, some desktop operating systems provide support for multiple user interface languages. Through this type of support for multiple user interface languages, users can configure the user interface of the operating system to operate in any of a number languages supported by the host operating system.

In addition to operating system support, many application programs also support the use of multiple languages for international users. For instance, a word processing program may allow a user to create documents in English, Thai, Vietnamese, or any other language installed in the operating system and enabled by the user. Documents may also be created that contain text or other information in a combination of languages. In fact, international users of such applications frequently create documents that include text in more than one language.

When creating foreign language documents, users may wish to express numbers using text (e.g. "one-hundred twenty three") in the language of their target audience. However, if the user does not speak the language of their target audience, it may be difficult for the user to translate the number (e.g. "123") into the target language. (e.g. "cent vingt-trois"). Moreover, when a user receives a foreign language document, the document may contain numbers expressed using digit shapes unfamiliar to the user. In this situation, it may also be very difficult for the user to convert the foreign language digit shapes to digit shapes that the user understands.

Therefore, in light of the above, there is a need for a method, system, and apparatus for easily converting numbers expressed using digit shapes to text in any of a number of languages. Moreover, there is a need for a method, system, and apparatus for converting numbers expressed using digit shapes to different digit shapes.

SUMMARY OF THE INVENTION

Embodiments of the present invention solve the above-described problems by providing a method, system, and apparatus for easily converting numbers expressed as digit shapes to text in a user-selected language. Moreover, embodiments of the present invention provide a method, system, and apparatus for converting numbers expressed using digit shapes to different digit shapes. Moreover, embodiments of the invention present conversion options to the user in a user-selected language and only present options for converting to text or digit shapes in languages that are enabled within a host application.

According to one actual embodiment of the present invention, a method is provided for converting a number expressed as digit shapes to text in a system for creating and editing an electronic document. According to this embodiment of the invention, software modules are executed in conjunction with a software application for creating and editing an electronic document that allow the convenient conversion of numbers expressed using digits to text. When a user types a string of text, such as a paragraph, the string is analyzed to determine whether the string of text includes a number expressed using digits (e.g. "123"). If the string of text includes a number expressed using digit shapes, the number is semantically labeled with schema information that indicates that the number may be converted to text.

Once a number expressed using digit shapes has been identified within a string of text, such as a paragraph, the application may display an indication to the user that the number has been semantically labeled. This indication also identifies to the user that actions may be performed on the number. When a selection is received of the number or the indication, a list of actions may be provided to the user identifying conversion options available for the number. For instance, a list of actions may be presented to the user for converting the number to text in any of a number of languages. Additionally, conversion options may also be presented to the user for converting the digit shapes of the number to digit shapes in another language.

According to one embodiment of the invention, a current user interface language setting for the application program is determined prior to providing the list of actions to the user. When the user selects the list of actions, the available actions are displayed to the user in a language specified by the current user interface language setting. In this manner, the user is always presented the conversion options in the current user interface language.

According to another actual embodiment of the invention, each of the enabled languages for the application program may also be identified prior to displaying the list of actions. Once the enabled languages have been identified, actions may be included in the list of actions only for converting the number to text in languages that are enabled. In this manner, a user is never presented with conversion options for converting to text in languages not enabled for use with the application program.

After the list of actions has been displayed to the user, a selection of one of the actions may be received. In response to receiving the selection of a conversion action, a converted number may be generated by converting the selected number to the text in the language identified by the selected action. Alternatively, a selection of a conversion action for converting the selected number to different digit shapes may be received. In response to such a selection, a converted number is generated by replacing each of the digit shapes in the selected number with a corresponding different digit shape. Once the conversion has been completed, the converted number may be inserted into the string of text to replace the selected number. According to various embodiments of the present invention, a document object model supported by the host application may be utilized to insert the converted number into the string of text.

According to another embodiment of the present invention, a system is provided for converting a number expressed as digits to text or to different digits. According to this embodiment of the invention, the system includes a recognizer plug-in capable of receiving a portion of an electronic document as a string of text from an application program. For instance, the recognizer plug-in may receive a paragraph of text from an application program as it is typed by the user. Once the recognizer plug-in has received the string of text, the recognizer plug-in analyzes the string of text to determine whether the string of text includes a number expressed using digits. If the string of text includes a number expressed using digits, the recognizer plug-in semantically labels the number with schema information identifying the number as being capable of conversion to text. This information is then passed by the recognizer plug-in back to the application program.

According to one embodiment of the invention, the system also includes an application program for creating and editing an electronic document. For instance, the application program may comprise a word processor, a spreadsheet application program, an e-mail application which includes editing functions, or other types of application programs for creating and editing electronic documents. According to this embodiment of the invention, the application program is capable of displaying the string of text along with an indication that the number has been semantically labeled by the recognizer plug-in. This indication may comprise a user interface object for indicating to a user that the number has been semantically labeled and that conversion actions may be performed on the number.

The application program may also be operative to receive a selection of the number or the indication and to provide a list of actions that may be performed on the number to convert the number to text or to different digit shapes. The application may then receive the selection of one of the list of actions and provide the selection and the number to an action plug-in.

The system also includes an action plug-in that is capable of generating a converted number by converting the selected number to text in the language identified by the selected action from the list of actions. The action plug-in may also generate a converted number by converting the selected number to digit shapes identified by the selected action from the list of actions. The action plug-in is also operative to replace the selected number with the converted number in the string of text. According to one actual embodiment of the invention, the action plug-in may replace the number with the converted number in the string of text by accessing a document object model provided by the application program.

According to various embodiments of the present invention, the system provided herein may also include an action plug-in that is operative to register with the application program prior to performing any conversion functions. As a part of the registration procedure, the action plug-in may provide the list of actions that may be performed on the number to convert the number to text or digit shapes. Moreover, when creating the list of actions, the action plug-in may determine a current user interface language setting for the application program and generate the action menu items in a language specified by the current user interface language setting. Additionally, the action plug-in may also identify one or more enabled languages for the application program and generate each of the action menu items only for conversion to text and digit shapes corresponding to the enabled languages. In this manner, the action plug-in ensures that users will be presented lists of actions in the current user interface language and only for conversions supported by the currently enabled languages of the application program.

Other embodiments of the present invention also provide a computer-controlled apparatus and a computer-readable medium for converting numbers to text and digit shapes in a user-selected language based on semantically labeled strings.

These and other details regarding the various embodiments of the invention will become more apparent from the detailed description that follows.

BRIEF DESCRIPTION OF THE DRAWINGS

FIGS. 3A-3B are screen diagrams showing screen output provided by various embodiments of the present invention;

DETAILED DESCRIPTION OF AN ILLUSTRATIVE EMBODIMENT

As described briefly above, embodiments of the present invention provide a method, system, apparatus, and computer-readable medium for converting numbers to text and digit shapes in a user-selected language. In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1:
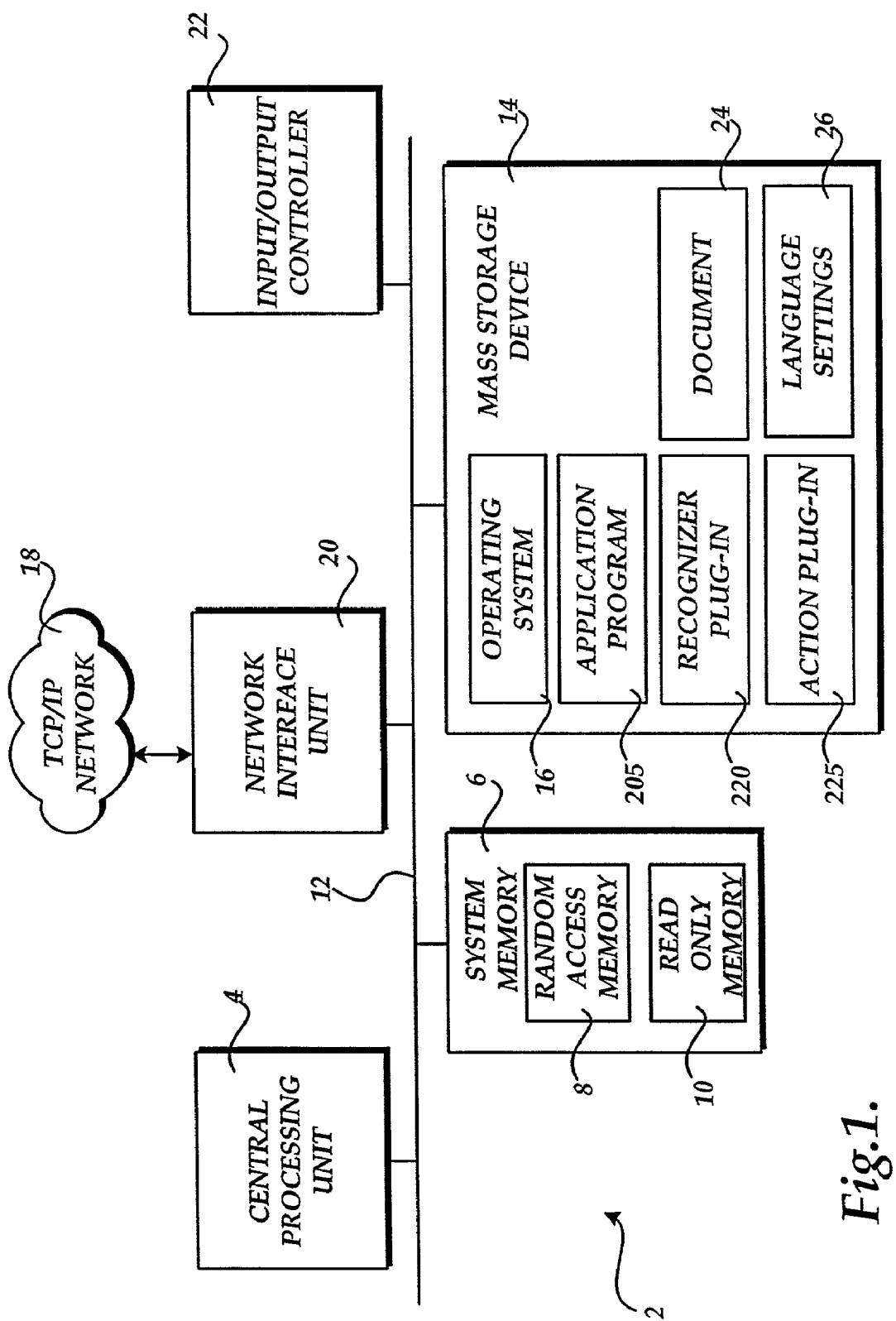
FIG. 1 is a block diagram showing the architecture of a personal computer that provides an illustrative operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules. Additional aspects of an illustrative operating environment and software architecture for implementing the various embodiments of the present invention are described in U.S. patent application Ser. No. 09/588,411, entitled "Method and System for Semantically Labeling Strings and Providing Actions Based on Semantically Labeled Strings", which is expressly incorporated herein by reference.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS XP operating system from MICROSOFT CORPORATION of Redmond, Wash. The mass storage device 14 and RAM 8 may also store one or more application programs. In particular, the mass storage device 14 and RAM 8 may store an application program 205 for creating and editing an electronic document 24. For instance, the application program 205 may comprise a word processing application program and the electronic document 24 may comprise a word processing document. The application program 205 may also comprise a spreadsheet application program and the electronic document 24 comprise a spreadsheet. Similarly, the application program 205 may comprise an electronic mail application program and the electronic document 24 may comprise an electronic mail message. Application programs for creating and editing other types of electronic documents may also be used with the various embodiments of the present invention.

Embodiments of the present invention provide program modules for use in conjunction with the application program 205 that convert numbers expressed using digit shapes contained within the electronic document 24 to text or to digit shapes in other languages. In particular, embodiments of the invention provide a recognizer plug-in 220 and an action plug-in 225. As will be described in greater detail below, the recognizer plug-in 220 recognizes numbers in an electronic document 24 and labels the numbers with semantic information. The recognizer plug-in 220 then passes this information to the application program 205 for use by the action plug-in 225. The action plug-in 225 performs actions on the recognized numbers for converting numbers expressed using digit shapes to text or to digit shapes in a user-selected language.

According to various embodiments of the present invention, the action plug-in 225 may also generate a list of actions that may be performed on a given number. As a part of this process, the action plug-in 225 may query language settings 26 of the application program 205 or operating system 16. The language settings 26 specify the current user interface language and the currently installed and enabled languages for the application program 205 and the operating system 16. The list of actions may then be customized based on the current user interface language and the installed languages. Additional details regarding the operation of the recognizer plug-in 220 and the action plug-in 225, including the use of the language settings 25 will be described in greater detail below.

Figure 2:
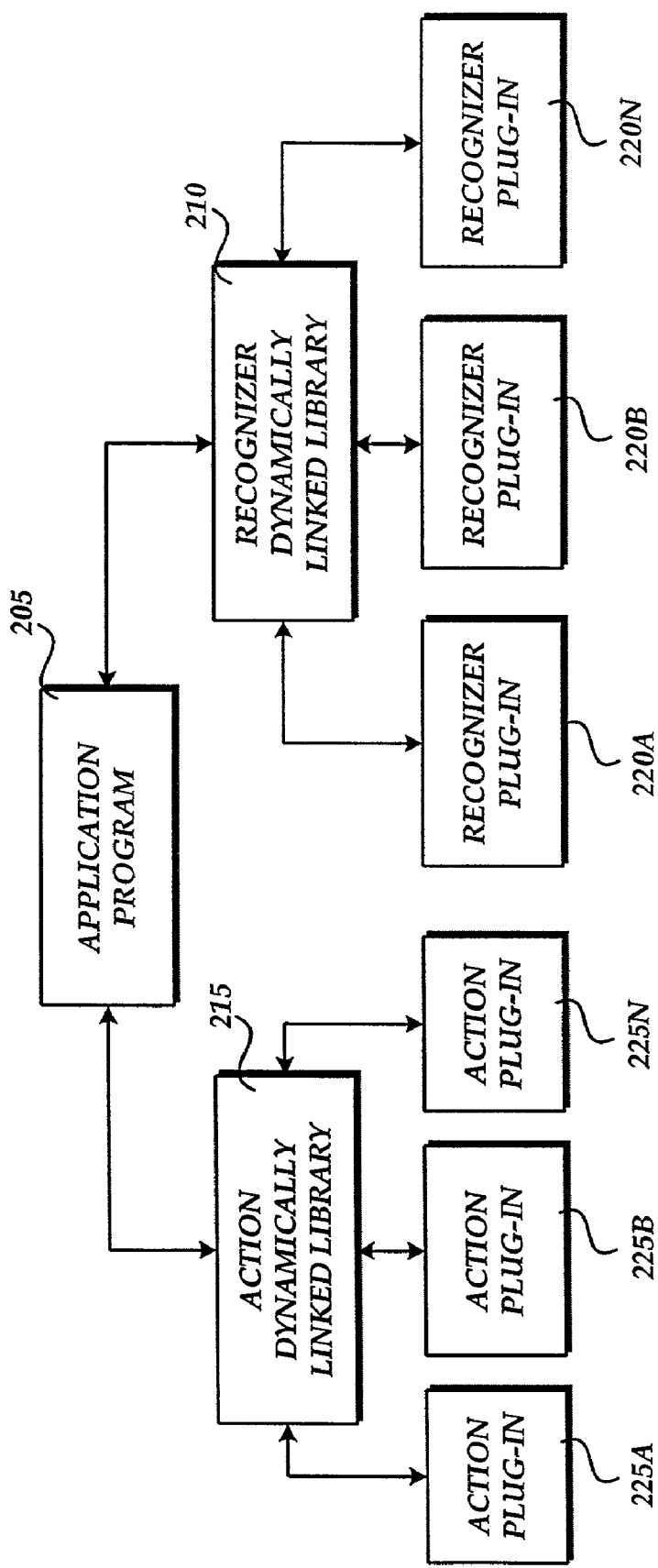
FIG. 2 is a block diagram that shows a software architecture for recognizing, labeling, and performing actions on arbitrary strings of text according to various embodiments of the present invention.

Referring now to FIG. 2, an illustrative software architecture for use in conjunction with the various embodiments of the present invention will be described. The architecture shown in FIG. 2 includes an application program 205, such as a word processor application program, a spreadsheet application program, or other type of application program for creating and editing electronic documents. The application program 205 may also comprise a Web browser.

The application program 205 is able to communicate with a recognizer dynamically linked library ("DLL") 210 and an action DLL 215. As will be described in greater detail below, the recognizer DLL 210 controls one or more recognizer plug-ins 220A-220N and the action DLL 215 controls one or more action plug-ins 225A-225N.

According to one embodiment of the invention, the recognizer plug-ins 220A-220N and the action plug-ins 225A-225N are automation servers. Automation servers are well-known software components that are assembled into programs or add functionality to existing programs running on the WINDOWS XP operating system from MICROSOFT CORPORATION of Redmond, Wash. Automation servers may be written in a variety of computing languages and can be plugged and unplugged at runtime without having to recompile the host program.

The recognizer DLL 210 handles the distribution of text strings from an electronic document being edited by the application program 205 to the individual recognizer plug-ins 220A-220N. The recognizer plug-ins 220A-220N recognize particular strings in an electronic document, such as a word processing document or a spreadsheet document. The recognizer plug-ins 220A-220N may be packaged with the application program module 205 or they may be written by third parties to recognize particular strings of interest. Typically, the recognizer DLL 210 passes strings to the recognizer plug-ins 220A-220N in single paragraphs or cell value increments. However, strings may be passed to the recognizer plug-ins 220A-220N in other sizes and formats.

As part of recognizing certain strings as including semantic information, the recognizer plug-ins 220A-220N determine which strings are to be labeled and how they are to be labeled. After receiving these results from the various recognizer plug-ins 220, the recognizer DLL 210 sends semantic categories to the application program module 205. According to one actual embodiment of the invention, a recognizer plug-in 220 is provided for recognizing strings as containing numbers expressed using digit shapes. According to this embodiment of the invention, the semantic category comprises schema information that identifies the number and whether it is to be handled as a decimal number, an integer number, or both. This information is returned to the recognizer DLL 210 by the recognizer plug-in 220 along with other information that may be utilized by a corresponding action plug-in 225, such as a copy of the number. Additionally, the recognizer plug-in 220 may return information identifying the location of the number within the text string, including the length of the text string and the character number of the first digit of the number.

Semantic categories are stored as part of the electronic document along with other document information and are available when a document is transmitted from one computer to another computer. According to one embodiment, storing semantic categories in an electronic document is controlled by an "Embed semantic categories" checkbox. The checkbox is on by default. Turning it off will prevent semantic categories in the document from being saved. The state of the checkbox is per document. The same checkbox controls saving for both .htm and .doc documents. Checking a "Save semantic categories as eXtensible Markup Language (XML) properties" checkbox (off by default) will write out the text of all of the semantic categories in the document and their labels in the header of the Hypertext Markup Language (HTML) file in XML (that is using the same tags as are used inline, but surrounded by <xml> And </xml>) for easy identification and parsing by search engines and knowledge management systems.

It should be appreciated that each of the recognizer plug-ins 220A-220N are executed separately. The recognizer DLL 210 is responsible for handling the asynchronicity that results from different recognizer plug-ins 220A-220N returning results at different times. In this manner, various types of data may be recognized within a text string and different actions provided for each semantically labeled string. Additional details regarding the operation of the recognizer plug-in 220 for recognizing numbers will be described below with reference to FIGS. 3-8.

After a string is labeled by a recognizer plug-in 220A-220N, schema information is sent to the application program module 205. A user of the application program module 205 may then execute actions that are associated with the schema information on the recognized string. The action DLL 215 manages the action plug-ins 225A-225N that are executed in order to perform the actions. As with the recognizer plug-ins 220A-22N, the action plug-ins 225A-225N may be packaged with the application program module 205 or written by third parties to perform particular actions that are of interest. The action plug-ins 225A-225N provide possible actions to be presented to the user based upon the schema information, or type label, associated with the string. As will be described in greater detail below, the list of actions provided to the user is dynamically generated for each schema type. This information is then provided to the application program 205 which displays the list of actions to the user when the string is selected.

After an action has been chosen from the list of actions, the action DLL 215 manages the appropriate action plug-in 225A-225N and passes the necessary information between the action plug-in and the application program module 205 so that the action plug-in may execute the desired action. Typically, the application program module 205 sends the action DLL 215 an automation request to invoke the action the user has selected. As will be described in greater detail below, according to one embodiment of the invention, an action plug-in 225 is provided that converts recognized numbers to text or digit shapes in a user-selected language. Addition details regarding the operation of the action plug-in 225 will be described in greater detail below with reference to FIGS. 3-8.

Turning now to FIGS. 3A and 3B, illustrative output provided by various embodiments of the present invention will be described. In particular, FIG. 3A shows a list of text strings representing the number "123" in a variety of different languages. As will be discussed in greater detail below, if a user types the number "123" into an electronic document, embodiments of the present invention will recognize the number and label the number with schema. Additionally, the number will be displayed in a manner to indicate to the user that conversion options may be performed by the user. If the user selects the number, a list of actions may be provided to the user for converting the number to text in one of a variety of languages. The user may then select one of the conversion options to have the number converted to text. The list of text strings shown in FIG. 3A illustrates the possible outputs of the various embodiments of the invention for converting numbers to text strings.

FIG. 3B shows a list of numbers expressed using various digit shapes. According to the various embodiments of the invention, the list of actions may also include conversion options for converting the number to different digit shapes. For instance, the user may be provided with conversion options for converting the recognized number to Hindi digits or That digits. The list of numbers shown in FIG. 3B illustrates the possible outputs of the various conversion options according to one embodiment of the invention. It should, however, be appreciated the digit shapes shown in FIG. 3B are illustrative and that other digit shapes known to those skilled in the art may also be utilized.

Referring now to FIGS. 3C-3G, an illustrative user interface provided by the various embodiments of the present invention will be described. As mentioned briefly above, a string of text may be typed by a user into an application program module, such as a word processor. Once the user has provided the string of text, the string of text is provided to a recognizer plug-in 220 that recognizes numbers expressed using digits contained within the string of text. The number 32 identified by the recognizer plug-in 220 is identified to the application program module as a type of data upon which actions may be performed. Therefore, the application program module 205 provides an indication to the user that actions may be performed on the number 32. This indication may be provided to the user by highlighting the number 32 or providing a user interface indication 34 in proximity to the number 32.

Figure 3C:
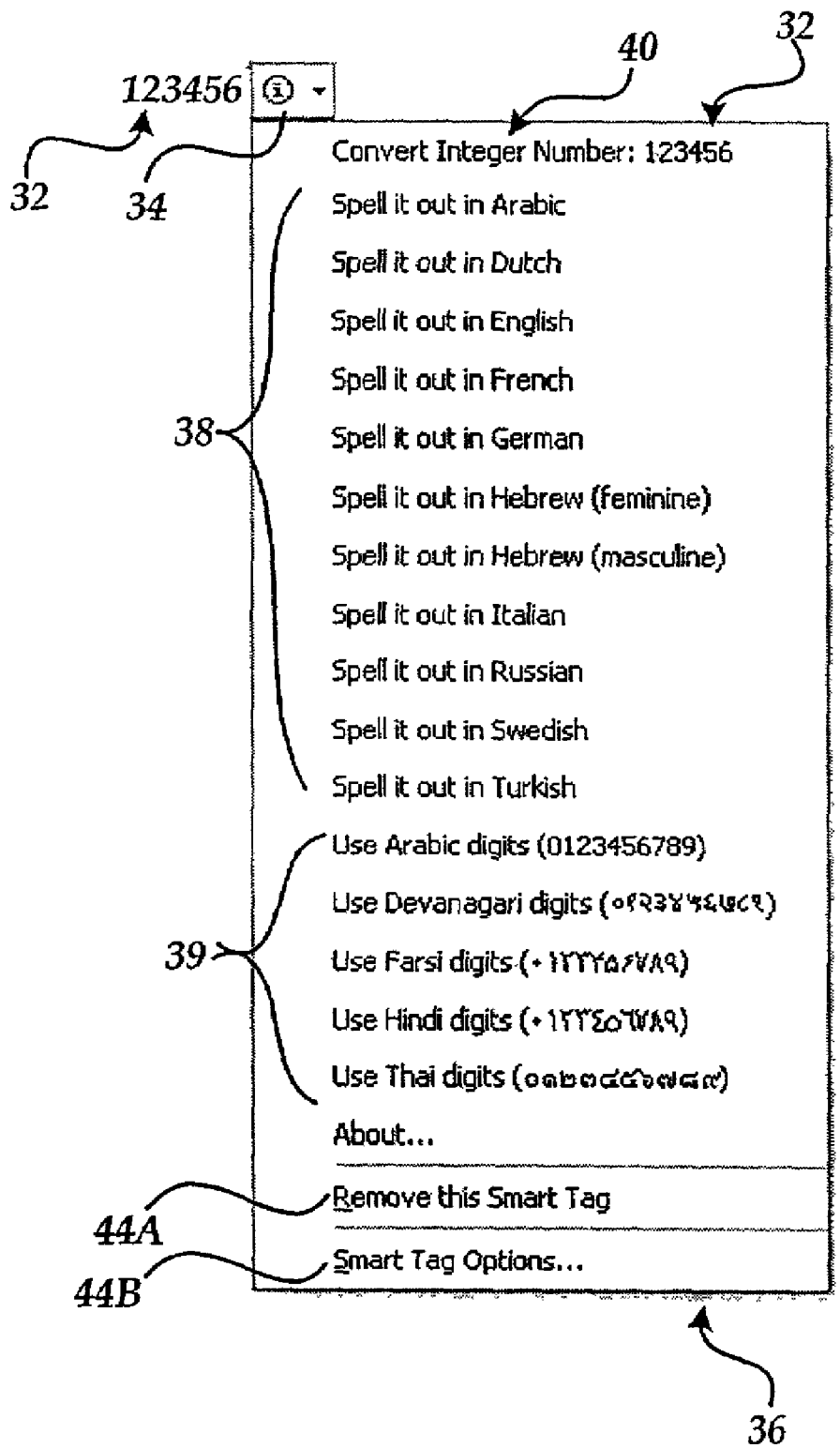
FIGS. 3C-3G are screen diagrams showing screen displays including an action menu for converting numbers to text and digit shapes in a user-selected language provided by various embodiments of the present invention.
Figure 3D:
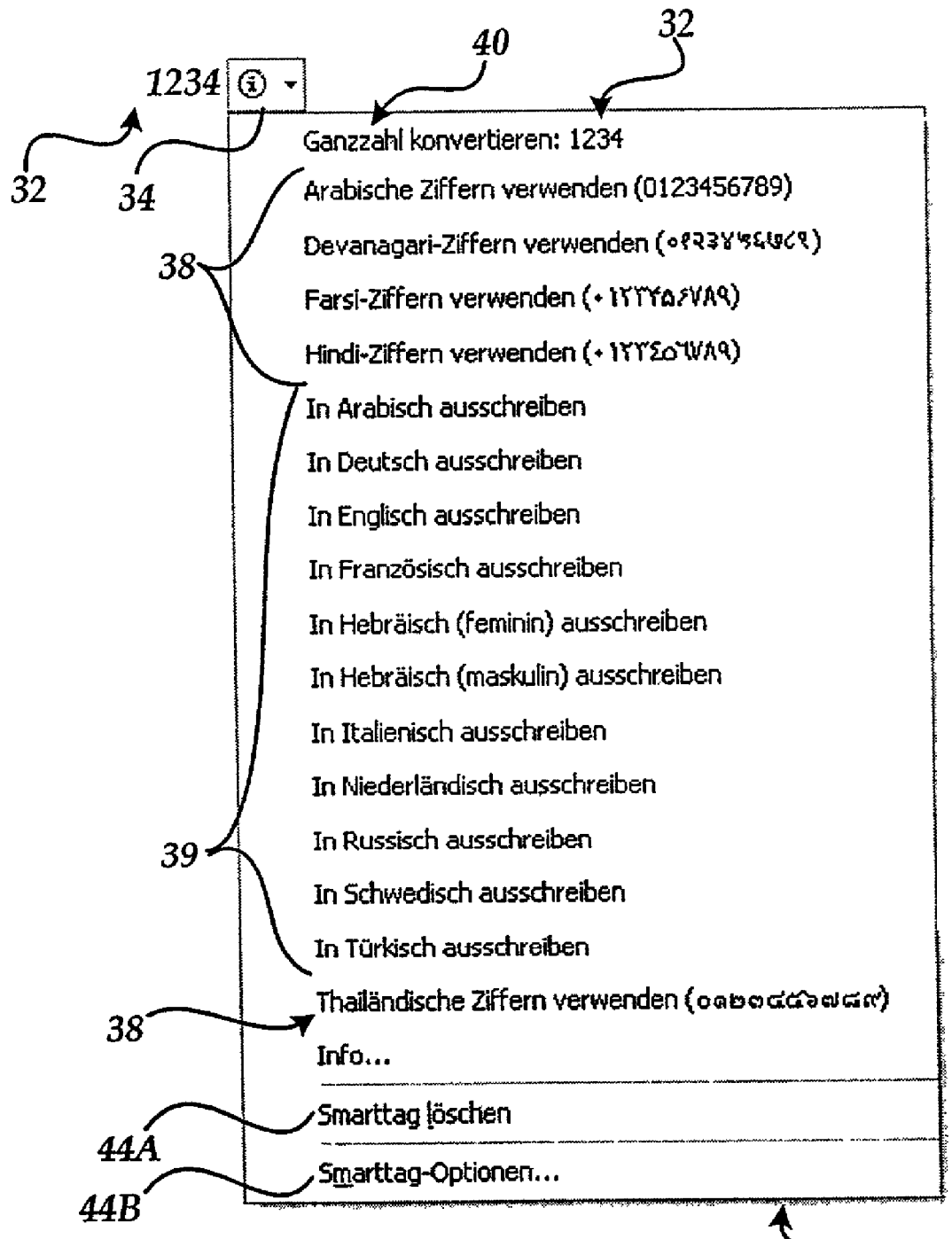

As shown in FIG. 3C, when the number 32 or the indication 34 is selected by a user, a list of actions is displayed that may be performed on the number to convert the number to text or different digit shapes. This list of actions may comprise a dropdown menu 36 having one or more menu items corresponding to the list of actions that may be performed on the number. According to one embodiment of the invention, the contents of the dropdown menu 36 may be displayed in one of many different languages. The language in which the dropdown menu 36 is displayed is based on a current user interface language for the application program module 205 or the operating system 16. In this manner, international users throughout the world will be displayed a dropdown menu 36 in their currently installed and active user interface language. For instance, FIG. 3D shows the dropdown menu 36 as it would be displayed if the currently installed and active user interface language was the German language.

As also shown in FIG. 3C, the dropdown menu 36 includes text 40 indicating that a conversion will take place and indicating whether the number is a decimal number or integer number. The dropdown menu 36 also includes another indication of the number 32 to be converted. The dropdown menu 36 also includes a list of actions 38 that may be performed to convert the number 32 to text in a user-selected language. Additionally, the dropdown menu 36 also includes a list of actions 39 that may be performed to convert the number to digit shapes in a user-selected language. According to one embodiment of the invention, the list of actions 38 and 39 displayed in the dropdown menu 36 is limited to conversion options to languages enabled on the personal computer 2. In this manner, actions for converting numbers to text and digits in languages not supported by the personal computer 2 will not be shown in the dropdown menu 36. For example, an action item for converting the number into French text would not appear on the dropdown menu 36 if support for the French language is not enabled on the personal computer 2.

As further shown in FIG. 3C, the application program module 205 also adds menu items 44A and 44B to the dropdown menu 36. The selection of item 44A removes the semantic labeling from a selected string of text and the selection of item 44B provides a list of user selectable preferences defining the operation and behavior of the recognizer and action plug-ins, including removing the recognizer plug-in 220 and the action plug-in 225.

As described briefly above, when a number 32 is recognized by the recognizer plug-in 220, the number 32 is labeled with schema information indicating that the number may be converted to text or digits in different languages. The schema information is then returned to the application program module 205 and is utilized by the action plug-in 225 to determine the appropriate list of actions 38 that should be included in the dropdown menu 36. In this manner, only conversion operations consistent with numbers that are expressed as digits are provided to the user via the dropdown menu 36. For instance, no conversion operations would be displayed if the number was originally expressed as text.

As will be discussed in greater detail below, the application program 205 receives most of the text shown in the dropdown menu 36 from the action plug-in 225. This process occurs when the application program 205 is initially executed and the action plug-in 225 registers itself with the application program 205. Additional details regarding this registration process will be described below with reference to FIG. 4.

Figure 3E:
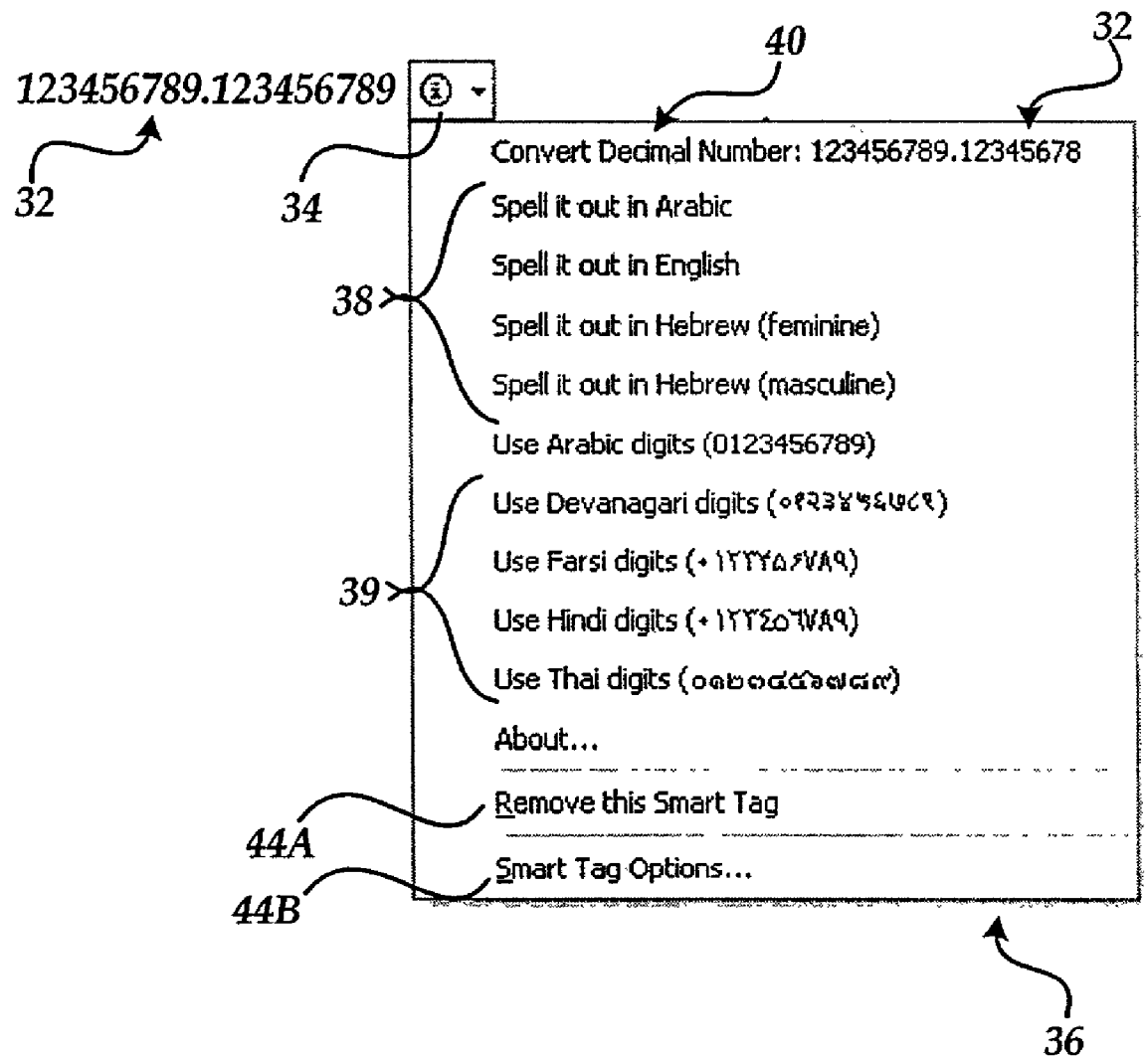

As shown in FIG. 3E, the recognizer plug-in 220 is also capable of recognizing decimal numbers. As with integer numbers, decimal numbers may also be converted to text in a user-selected language or converted to digit shapes in the user-selected language. However, because the use of decimal separator characters and thousands separator characters differs by country, it may be occasionally difficult to determine the proper usage of a particular character. For instance, in the United States a comma is typically used as a thousands separator character and a period is typically used as the decimal separator character. However, in other countries, a comma may be used as a decimal separator and a period may be used as a thousands separator. Therefore, it may be difficult to determine whether the number "1,234" is one-thousand two hundred thirty four or one and two-hundred thirty four one-thousandths.

Figure 3F:
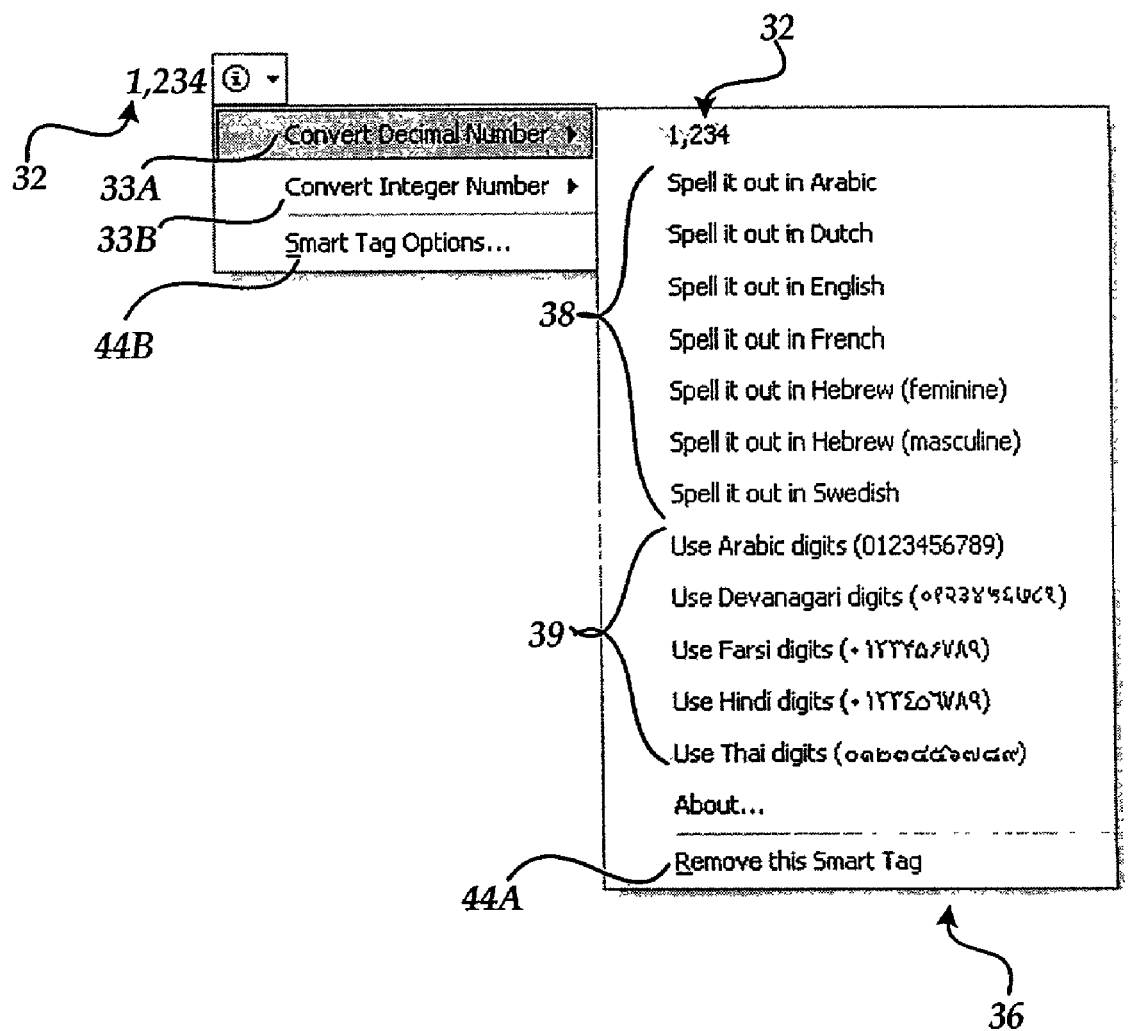
Figure 3G:
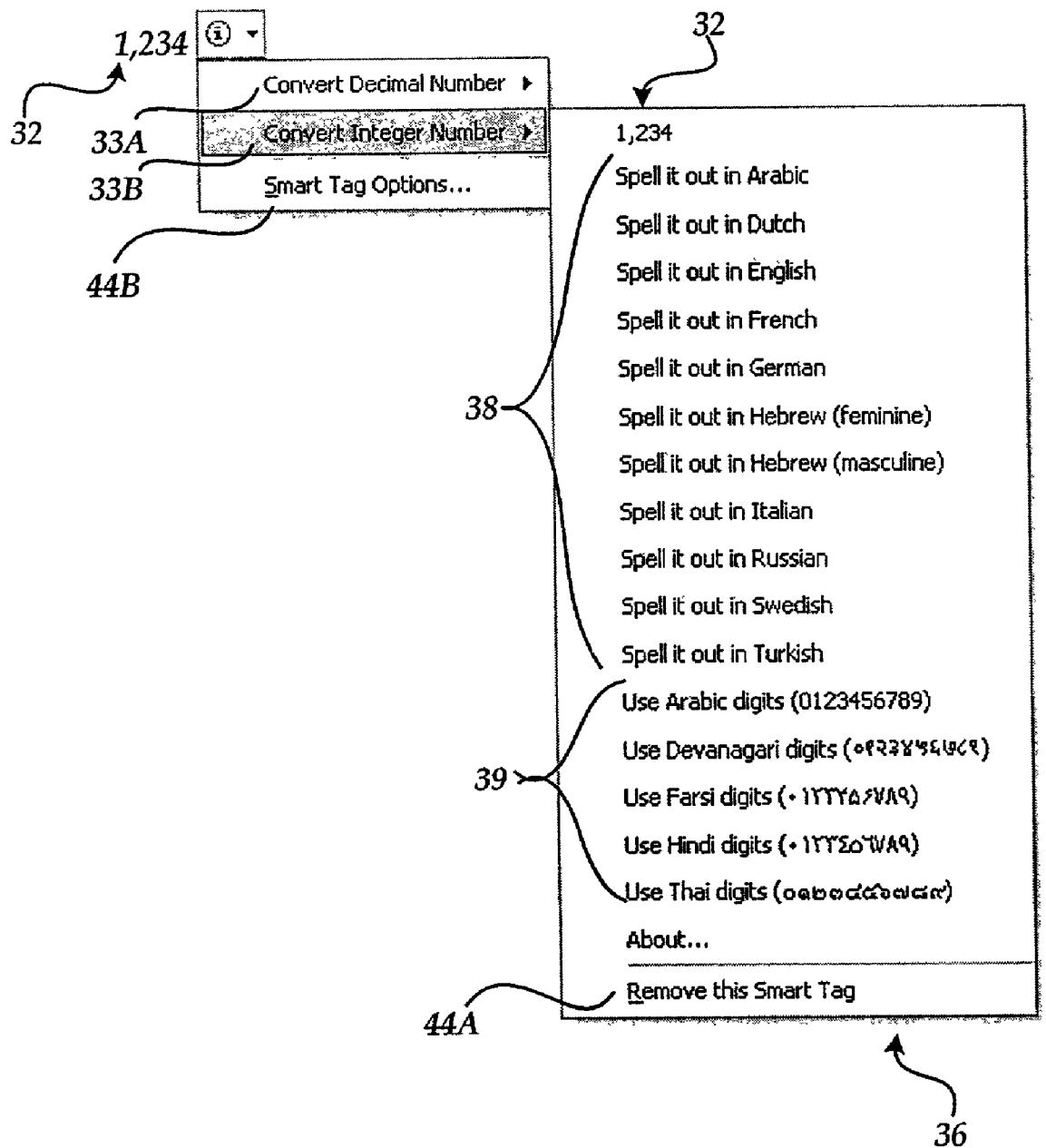

To account for the situation where the decimal or thousands separator characters are ambiguous, embodiments of the invention allow the user to indicate the proper usage. For instance, as shown in FIG. 3F, the number "1,234" has been typed. In order to ensure that an improper assumption is not made about the actual value of the number, the dropdown menu 36 includes a menu item 33A corresponding to conversion actions for decimal numbers and also a menu item 33B corresponding to conversion actions for integer numbers. These options are displayed and the user is provided with the appropriate menu. FIG. 3G shows the dropdown menu 36 for converting integer numbers. The user can then select the desired conversion action for the recognized number 32. It should also be appreciated that the recognizer plug-in 220 is also capable of recognizing numbers expressed utilizing different digit shapes.

Figure 4:
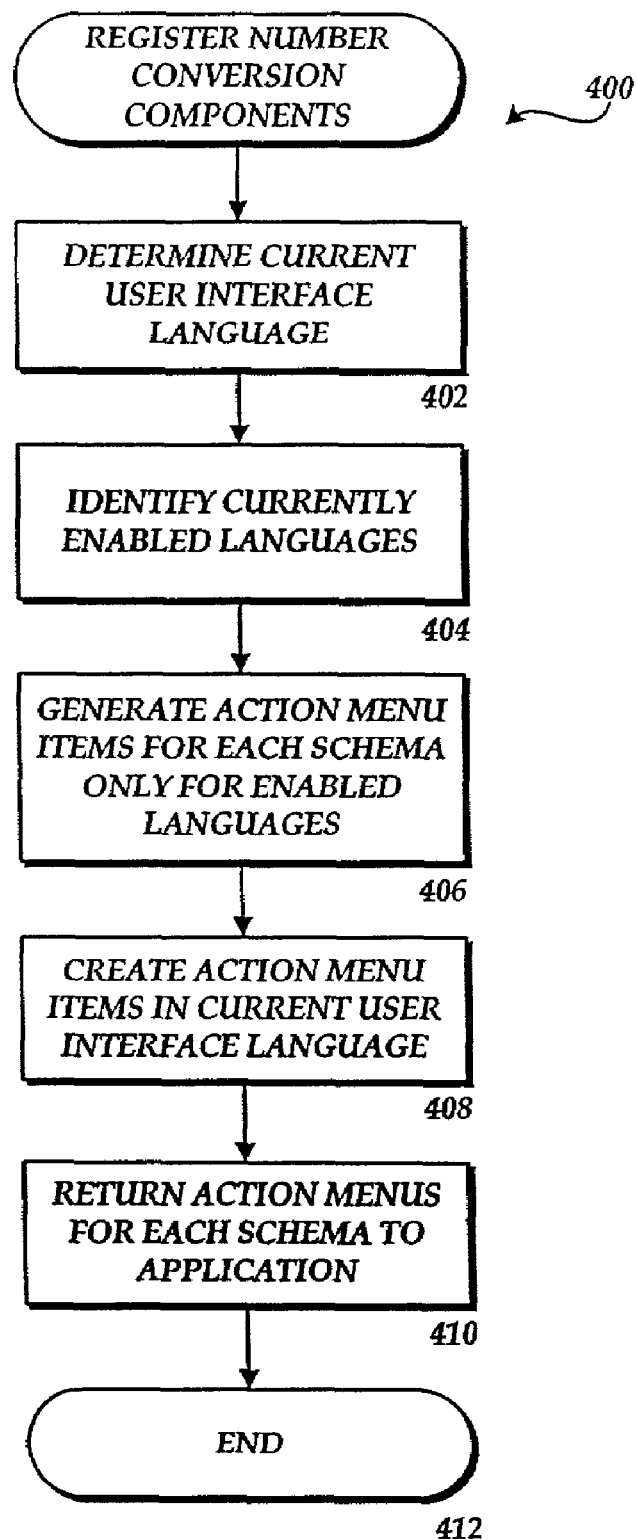
FIG. 4 is a flow diagram showing an illustrative routine for registering an action plug-in with an application program according to one actual embodiment of the present invention.

Referring now to FIG. 4, an illustrative routine 400 will be described for registering the number conversion software components with the application program 205. In particular, when the action plug-in 225 and the recognizer plug-in 220 for converting number to text and digit shapes are first executed, they are registered with the application program 205. By registering with the application program 205, the application program 205 is made aware of the software components and enabled for use with the schema types recognized by the recognizer plug-in 220. Moreover, the action items to be displayed to the user corresponding to each schema type are also enumerated to the application program 205 so that the application program 205 can display the dropdown menu 36 when a number 32 or indicator 34 is selected by a user.

The routine 400 begins at block 402, where the current user interface language is identified. As discussed briefly above, the current user interface language may be stored in the language settings 26 maintained by the operating system 16 or the application program 205. Once the current user interface language has been identified, the routine 400 continues to block 404. At block 404, the currently enabled languages are also identified. In particular, the language settings 26 may again be consulted to determine the languages that are enabled and installed for use with the operating system 16 or with the application program 205.

Once the currently enabled languages have been identified, the routine 400 continues to block 406, where action menu items are generated for each schema type for the enabled languages. In this manner, action items are generated for each schema type and for the currently enabled languages. No action items are generated for conversion options corresponding to languages that are not installed or enabled.

From block 406, the routine 400 continues to block 408, where the action menu items are created in the current user interface language. In this manner, the dropdown menu 36 displayed to the user is provided in the current user interface language. From block 408, the routine continues to block 410, where the action menus for each schema are returned to the application program 205. According to one embodiment of the invention, the application program 205 displays the dropdown menu 36 in response to the selection of a number 32 or an indicator 34. However, it should be appreciated that the action plug-in 225 or other software component may be responsible for the display of the dropdown menu 36. The routine 400 continues from block 410 to block 412, where it ends.

Figure 5:
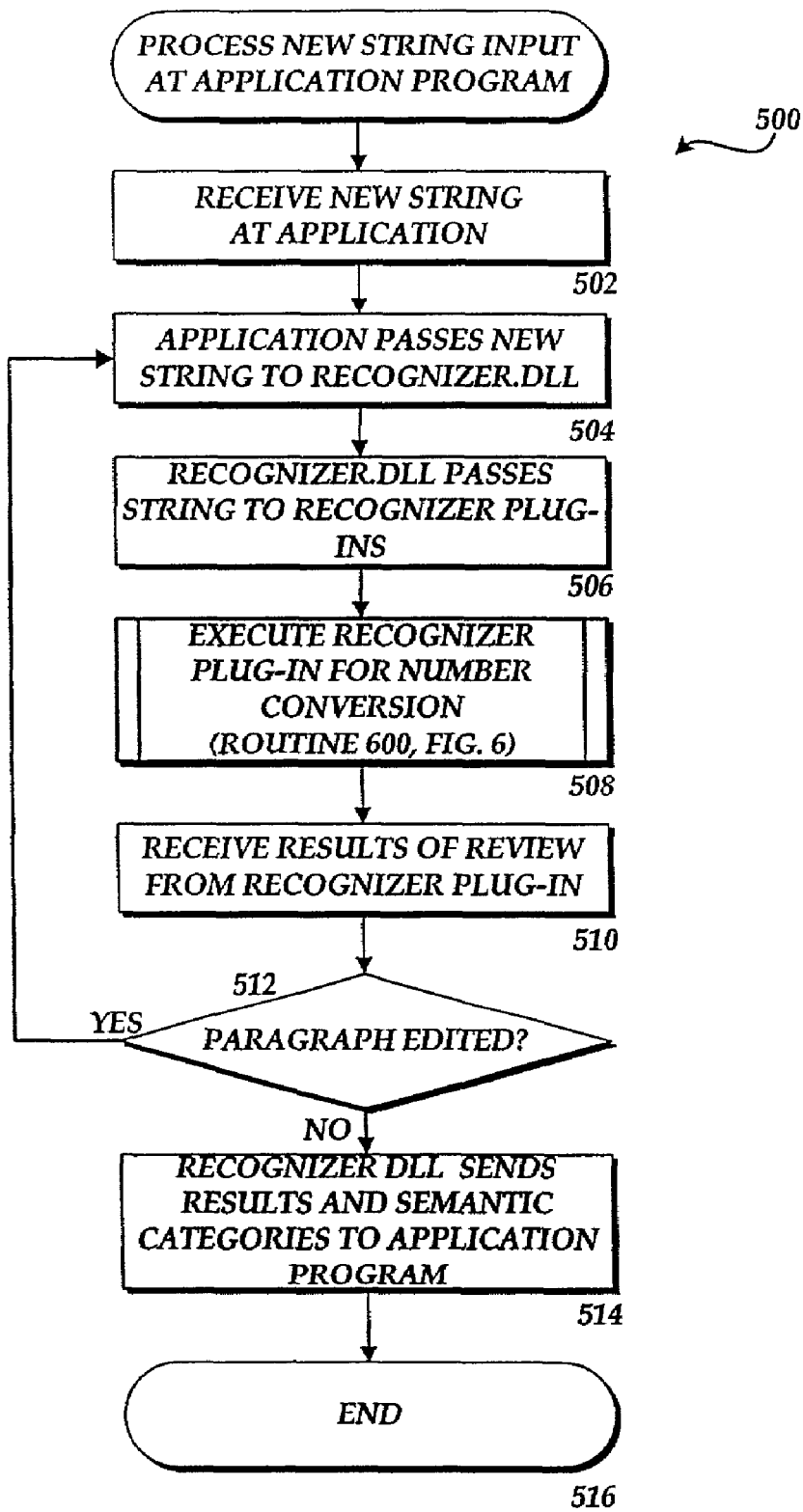
FIG. 5 is a flow diagram showing an illustrative routine for processing a string input provided at an application program according to one actual embodiment of the present invention.

Turning now to FIG. 5, an illustrative routine 500 will be described for processing the input of a new string at the application program 205. The routine 500 begins at block 502, where the application program 205 receives a new string, such as when a user enters a new paragraph into an electronic document or edits a previously entered paragraph. From block 502, the routine 500 continues to block 504 where the application program 205 passes the new string to the recognizer DLL 210. As described above, the recognizer DLL 210 is responsible for communicating with the application program 205, managing the jobs that need to be performed by the recognizer plug-ins 220A-220N, receiving results from the recognizer plug-ins 220A-220N, and sending schema information to the application program module 205 for recognized numbers. It should be understood that, in one embodiment of the invention, a paragraph is passed to the recognizer DLL 210 at block 504. However, in alternative embodiments, a sentence, the contents of a spreadsheet cell, a section of the document, the entire document, etc., may be passed to the recognizer DLL 210. In other words, it should be appreciated that the embodiments of the present invention are not limited to simply passing a paragraph to the recognizer DLL 210.

From block 504, the routine 500 continues to block 506, where the recognizer DLL 210 passes the string to the recognizer plug-ins 220A-220N. The routine 500 then continues to block 508 where the recognizer plug-ins are executed on the paragraph to recognize key words within the string. In particular, the recognizer plug-in for converting numbers to text and digit shapes in user-selected languages is executed on the string. An illustrative routine describing the operation of the recognizer plug-in for number conversion is described below with reference to FIG. 6.

At block 510, the results from the recognizer plug-in 220 are received at the recognizer DLL 210. The routine 500 then continues to block 512, where a determination is made by the recognizer DLL 210 as to whether the paragraph has been edited since the string was transmitted to the recognizer plug-ins 220A-220N. If the paragraph has been edited, the routine 500 returns to block 504, where the edited string is passed to the recognizer DLL 210. If the paragraph has not been edited, the routine 500 continues to block 514, where the recognizer DLL 210 sends the results received from the recognizer plug-in 220 to the application program 205. The routine 500 then continues to block 516, where it ends.

Figure 6:
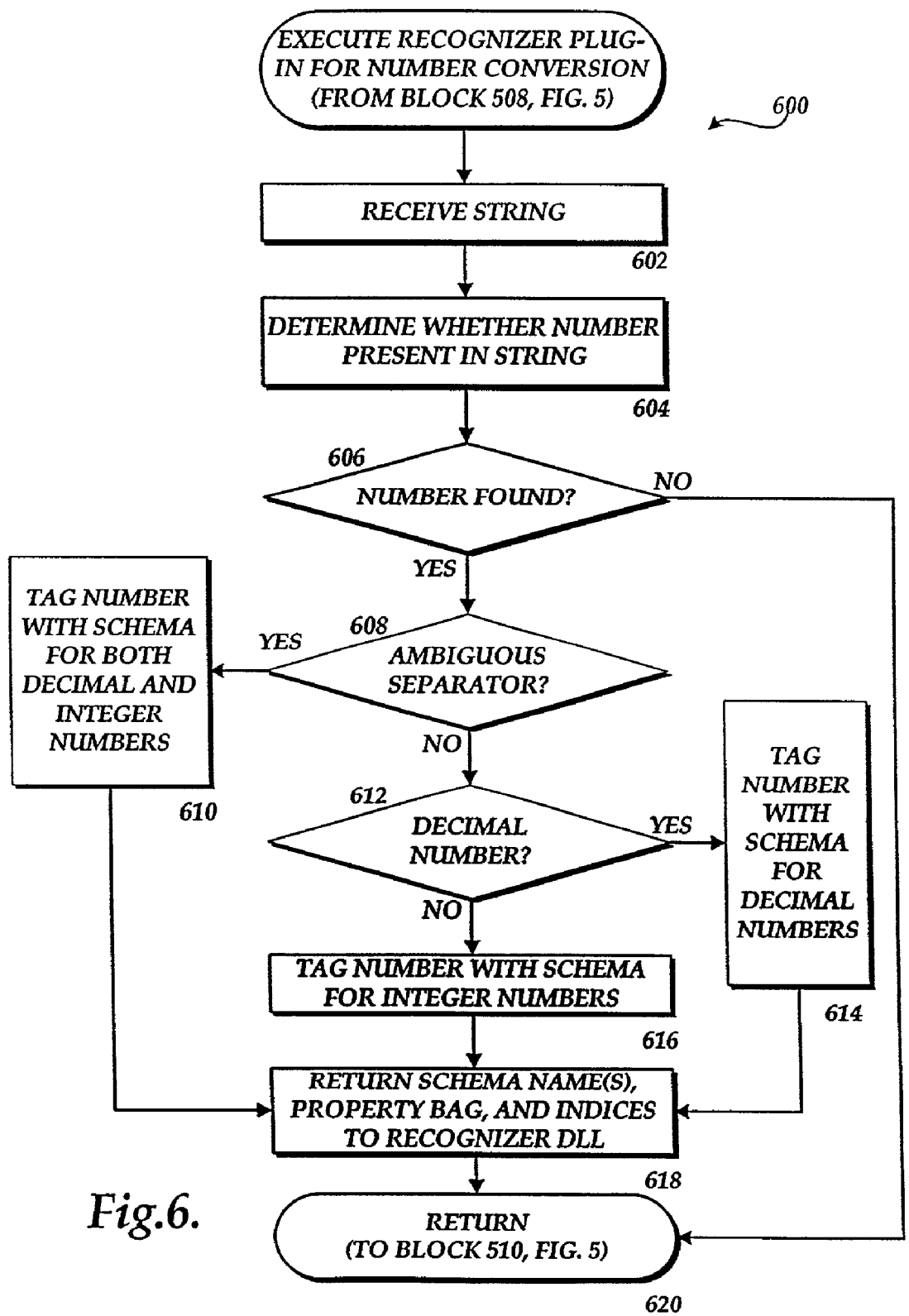
FIG. 6 is a flow diagram illustrating the operation of a recognizer plug-in software module provided according to one actual embodiment of the present invention.

Referring now to FIG. 6, an illustrative routine 600 will be described that illustrates the operation of the recognizer plug-in 220 for recognizing numbers according to one embodiment of the present invention. The routine 600 begins at block 602, where a string of text is received at the recognizer plug-in 220 from the recognizer DLL 210. The routine 600 then continues to block 604, where a determination is made as to whether the string of text contains a number expressed using digit characters, or shapes. As described above, the digit characters may be identified regardless of the language in which the characters are represented.

From block 604, the routine 600 continues to block 606, where a determination is made as to whether a number expressed using digits was found in the string of text. If no digits were found, the routine 600 branches from block 606 to block 620, where it returns to block 510, shown in FIG. 5. If, however, at block 606, it is determined that a number expressed using digits was found in the string of text, the routine 600 continues to block 608.

At block 608, a determination is made as to whether the recognized number includes separator characters that may be ambiguous. As described above, certain decimal and thousands separator characters are used inconsistently around the world. Therefore, it may be impossible to determine the actual value of a particular number. Accordingly, if a recognized number includes ambiguous separator characters, the routine 600 branches to block 610, where the number is tagged with schema information for both decimal and integer numbers. In this manner, a dropdown menu will be provided to the user for the number with options for converting both decimal and integer numbers and the user can make the determination as to the appropriate use of the ambiguous separator characters. From block 610, the routine 600 continues to block 618.

If, however, at block 608, it is determined that the recognized number does not contain any ambiguous separator characters, the routine 600 continues to block 612, where a determination is made as to whether the number is a decimal number. If the number is a decimal number, the routine 600 branches to block 614, where the number is tagged with schema information corresponding to decimal numbers. The routine 600 then continues from block 614 to block 618.

If, at block 612, it is determined that the number is not a decimal number, the routine continues to block 616, where the number is tagged with schema information corresponding to integer numbers. The routine 600 then continues from block 616 to block 618, where the schema names are returned to the recognizer DLL 210. Additionally, a "property bag" is also returned to the recognizer DLL 210. The property bag is an object which stores information about the recognized number that may be utilized by the action plug-in 225. In particular, the property bag includes a copy of the recognized number and the schema associated with the number. The property bag may also include other types of data about the number. The data stored in the property bag may be utilized by the action plug-in. From block 618, the routine 600 continues to block 620, where it returns to block 510, shown in FIG. 5.

Figure 7:
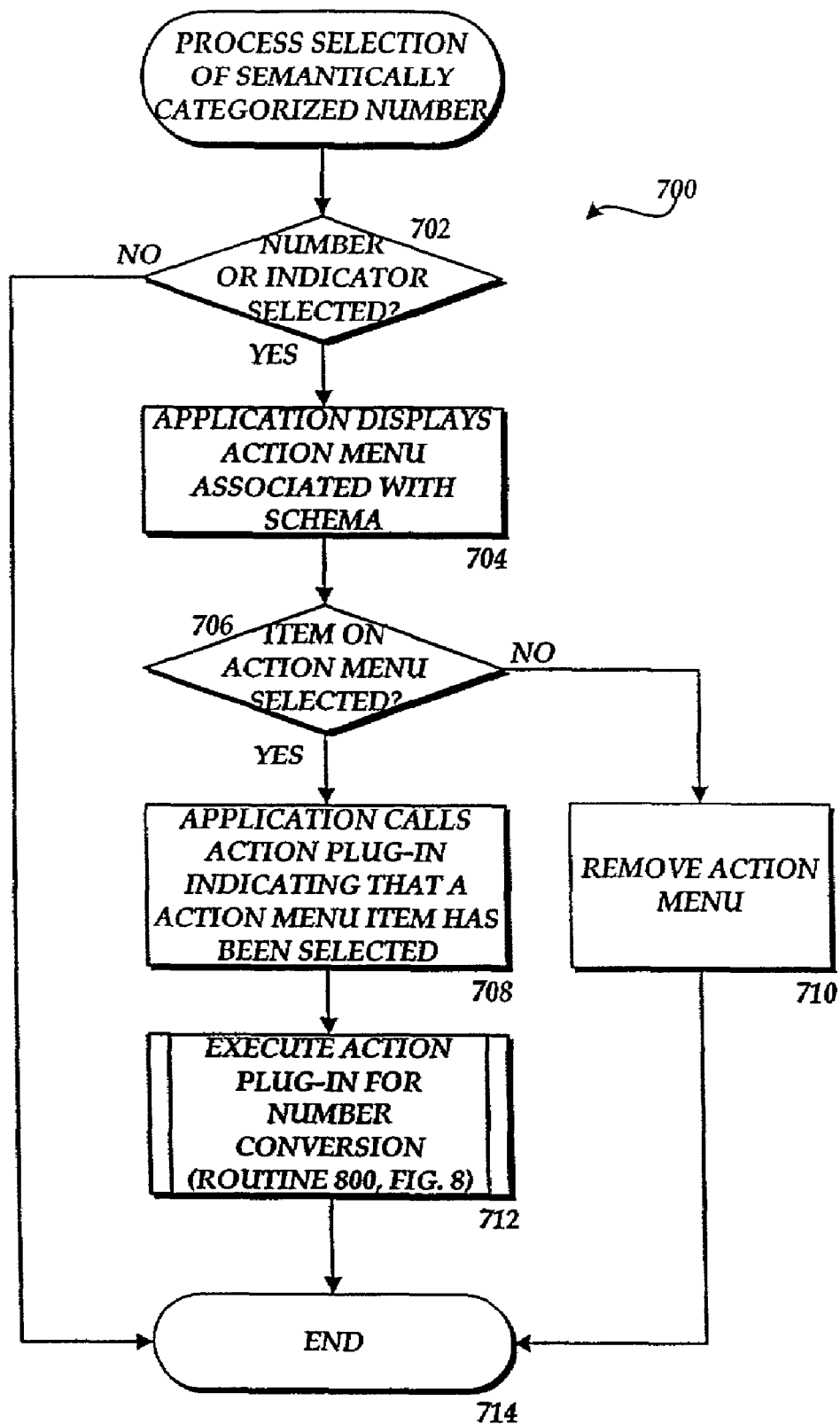
FIG. 7 is a flow diagram illustrating a routine for processing the selection of a semantically categorized number according to one actual embodiment of the present invention.

Referring now to FIG. 7, an illustrative routine 700 will be described for processing the selection of a semantically categorized number. As discussed above, once a number has been recognized within a string of text by the recognizer plug-in 220A, the number may be highlighted or an indication may be provided to the user indicating that the number has been recognized and that actions may be performed on the number. Accordingly, at block 702, a determination is made as to whether the number or indicator has been selected by a user. If the number has not been selected, the routine 700 continues to block 714, where it ends. If, however, the number or indicator has been selected, the routine 700 continues to block 704.

At block 704, the application program 205 displays the list of actions associated with the schema corresponding to the selected number. In this manner, the dropdown menu 36 described above with reference to FIG. 3C is presented to the user. The routine 700 then continues from block 704 to block 706, where a determination is made as to whether the user has selected one of the items from the list of actions. If the user has made the selection of a user interface item other than one of the items from the list of actions, the routine 700 branches to block 710, where the list of actions is removed. If, however, the user does select one of the items from the list of actions, the routine 700 continues to block 708.

At block 708, the application program 205 calls the action plug-in 225 corresponding to the appropriate schema type and indicates that an action item has been selected. The call from the application program 225 to the action plug-in 225 includes the schema name corresponding to the recognized number, the item number of the selected menu item, the name of the calling application program 205, a pointer into an object model provided by the application program 205 for accessing the document 24, the property bag described above with reference to FIG. 6, and the text of the recognized number. The routine 700 then continues to block 712, where the action plug-in for number conversion is executed. An illustrative routine for executing the action plug-in 225 for number conversion is described below with reference to FIG. 8. Once the action plug-in 225 has completed its execution, the routine 700 continues from block 712 to block 714, where it ends.

Figure 8:
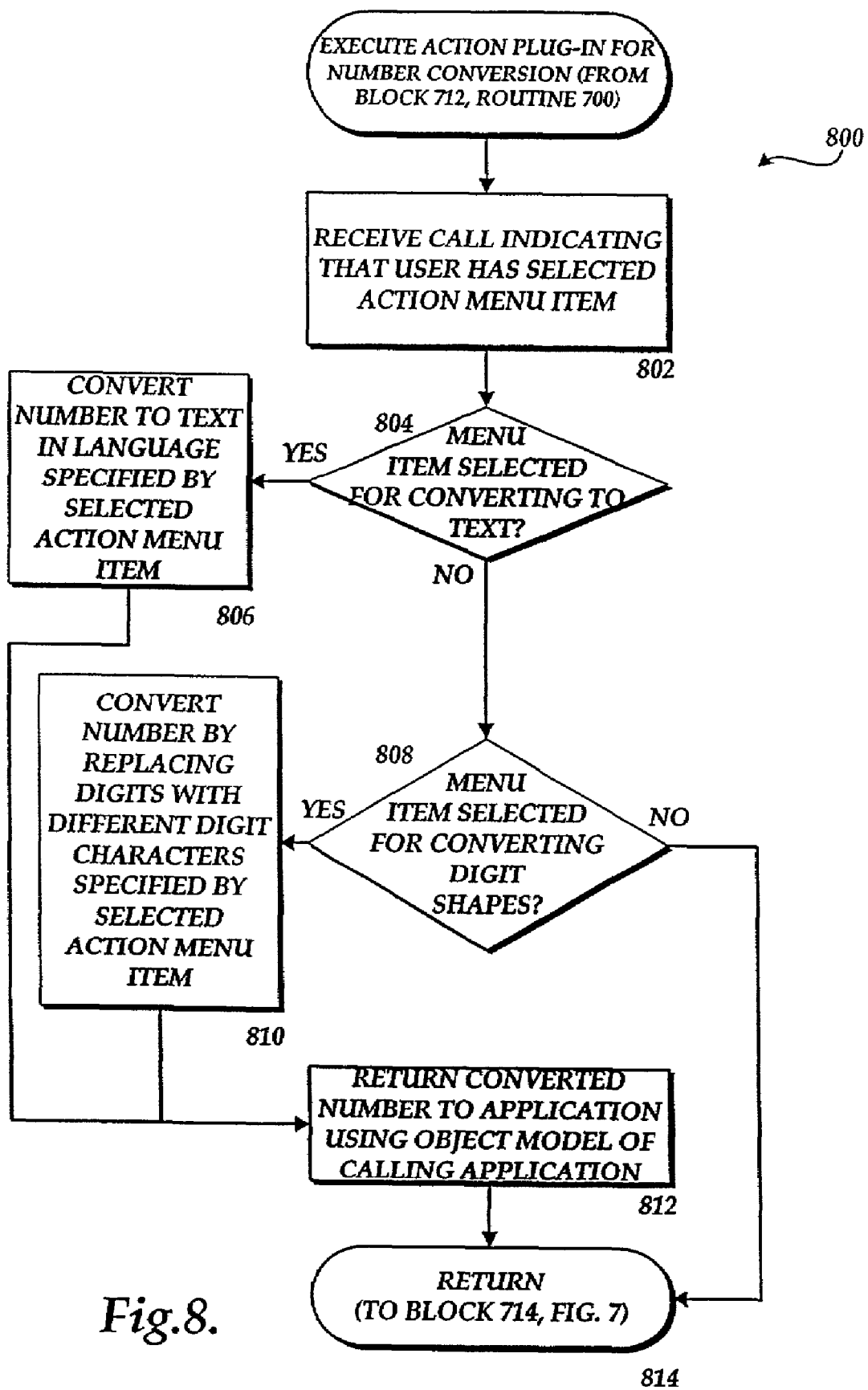
FIG. 8 is a flow diagram showing a routine for executing an action plug-in for converting numbers to text and digit shapes in a user-selected language according to one actual embodiment of the present invention.

Referring now to FIG. 8, an illustrative routine 800 will be described for executing an action plug-in 225 for number conversion. The routine 800 begins at block 802, where the action plug-in 225 receives a call from the action DLL 215 indicating that the user has selected an action menu item. From block 802, the routine 800 continues to block 804, where a determination is made as to whether a menu item has been selected for converting the selected number to text. If the user has requested that the selected number be converted to text, the routine 800 branches to block 806, where a converted number is generated by converting the selected number to text in the language identified by the user. The routine 800 then branches from block 812.

If, at block 804, it is determined that the user has not selected a menu item for converting the recognized number to text, the routine 800 continues to block 808. At block 808, a determination is made as to whether the user has selected a menu item for converting the recognized number to digit shapes. If the user has requested that the recognized number be converted to different digit shapes, the routine 800 branches to block 810, where the recognized number is converted to digit shapes in the character set identified by the user. The routine 800 then continues from block 810 to block 812.

At block 812, the number in the string of text is replaced with the converted number. According to one embodiment of the present invention, the replacement is made by accessing a document object model provided by the application program 205. Through the document object model, the action plug-in 225 can directly access the document 24 and make changes therein. Details regarding the use of such a document object model are well known to those skilled in the art. From block 812, the routine 800 continues to block 814, where it returns to block 714, described above with reference to FIG. 7.

Based on the foregoing, those skilled in the art should appreciate that various embodiments of the present invention provide a method, system, apparatus, and computer-readable medium for converting numbers expressed as digit shapes to text or digits in a user-selected language based upon semantically labeled strings. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for creating and editing an electronic document and for converting a number in a computer system comprising a memory storage and a processing unit, the method comprising:

receiving by the computer system a portion of the electronic document as a string of text; analyzing the string of text to determine whether the string of text includes a number expressed using digit shapes by identifying the number expressed using digit shapes regardless of a language in which the digit shapes are expressed;

in response to determining that the string of text includes the number expressed as digit shapes, semantically labeling by the computer system the number with schema information by associating the string of text with an inline eXtensible Markup Language (XML) tag belonging to at least one semantic category, indicating that the number is convertible and the semantic categories are being stored in the electronic document;

displaying, in a user interface on a display device, the string of text and an indication that the number has been semantically labeled;

receiving by the computer system a selection of the indication in the user interface;

in response to receiving the selection of the indication, providing by the computer system a dropdown menu in the user interface on the display device displaying a list of actions for converting the number expressed as digit shapes in the semantically labeled string of text, the list of actions being identified upon the schema information;

receiving by the computer system a selection of an action from the list of actions in the dropdown menu;

in response to receiving the selection of an action, generating by the computer system a converted number by converting the number expressed using digit shapes to the same number expressed as text; and replacing the number in the electronic document with the converted number in the string of text.

2. The method of claim 1, further comprising:

determining a current user interface language setting for an application program associated with the electronic document; and generating at least one menu item of the dropdown menu in a language specified by the current user interface language setting.

3. The method of claim 2, further comprising:

identifying at least one of the installed languages for the application program; and generating each of the menu items of the dropdown menu only for conversion to text in the installed languages.

4. The method of claim 3, wherein the list of actions further comprises a list of actions for converting the number expressed as digits to an identical number expressed as digits using different digit shapes.

5. The method of claim 4, further comprising:

receiving the selection of one of the actions of the list of actions for converting the number to different digit shapes; and in response to the selection, generating the converted number by replacing each digit of the number expressed using digits with a different digit shape corresponding to the digit and identified by the selection.

6. A system for converting a number expressed as digits to text, the system comprising:
    a memory storage; and
    a processing unit coupled to the memory storage, wherein the processing unit is operative to:
        execute a recognizer plug-in capable of receiving a portion of an electronic document as a string of text from an application program, analyzing the string of text to determine whether the string of text includes a number expressed as digit shapes by identifying the number expressed using digit shapes regardless of a language in which the digit shapes are expressed, and in response to determining that the string of text includes a number, semantically labeling the number with schema information by associating the number with an inline eXtensible Markup Language (XML) tag belonging to at least one semantic category;
        execute an application program for creating and editing the electronic document, the application program capable of displaying, on a display device, the string of text and an indication by a user that the number has been semantically labeled, receiving a selection of the indication, in response to receiving the selection of the indication providing a dropdown menu on the display device listing actions for converting the number contained in the semantically labeled text to one of: a number expressed as different digit shapes and a number to expressed as text in one of a plurality of languages, receiving the selection of an action from the dropdown menu listing, and providing the selected action and the number to an action plug-in; and
        execute an action plug-in capable of generating a converted number by converting the number to one of: a number expressed in different digit shapes and a number expressed as text in the language identified by the selected action, and replacing the number with the converted number in the string of text associated with the application program.

7. The system of claim 6, wherein the list of actions comprises a dropdown menu having at least one menu item corresponding to the list of actions to be performed on the number to convert the number to text, and wherein the processing unit being operative to execute the action plug-in further comprises the processing unit being operative to:
    determine a current user interface language setting for the application program; and to
    generate the menu items of the dropdown menu in a language specified by the current user interface language setting.

8. The system of claim 6, wherein the processing unit being operative to execute the action plug-in further comprises the processing unit being operative to execute the action plug-in being further operative to identify at least one enabled language for the application program and to generate each of the menu items of the dropdown menu only for conversion to text in the enabled languages.

9. The system of claim 8, wherein the processing unit being operative to execute the application program is further comprises the processing unit being operative to execute the application program being operative to provide a list of actions to be performed on the number to convert the number to digit shapes in one of the enabled languages, and wherein the processing unit being operative to execute the action plug-in further comprises the processing unit being operative to execute the action plug-in capable of generating the converted number by converting the number to digit shapes in a language identified by the selected action.

10. A computer-readable storage medium which stores a set of instructions for an application program which when executed by a computer system comprising a processing unit and a storage device performs a method for creating and editing an electronic document and for converting a number, the method executed by the set of instructions comprising:
    determining by the computer system whether a string of text within the document contains a number expressed as digit shapes by identifying the number expressed using digit shapes regardless of a language in which the digit shapes are expressed;
    in response to determining that the string of text includes the number expressed as digit shapes, semantically labeling by the computer system the number with schema information by associating the string of text with an inline eXtensible Markup Language (XML) tag belonging to at least one semantic category, indicating that the number is convertible and displaying in a user interface the number identified as digit shapes;
    generating and displaying on a display device in the user interface a list of actions for converting the semantically labeled string of text to contain the number expressed as different digit shapes, the list of actions being identified upon the schema information;
    responsive to a selection by the user of an action from the displayed list, generating by the computer system a converted number by converting the number to equivalent text in a language identified in the selection by the user and replacing each digit shape in the selected number with a corresponding different digit shape in the language identified in the selection by the user; and then
    inserting by the computer system the converted number into the string of text in the electronic document to replace the selected number therein expressed as digit shapes.

11. The computer-readable storage medium of claim 10, wherein the list of actions further comprises a list of actions for converting the number expressed as digits to an identical number expressed as digits using different digit shapes.

12. The computer-readable storage medium of claim 11, wherein the set of instructions further comprising:
    receiving the selection of one of the actions of the list of actions for converting the number to different digit shapes; and
    in response to the selection, generating the converted number by replacing each digit of the number expressed using digits with a different digit shape corresponding to the digit and identified by the selection.

13. The computer-readable storage medium of claim 10, wherein replacing the number in the string of text with the converted number comprises utilizing a document object model provided by the application program for editing the electronic document to replace the number with the converted number.

14. The computer-readable storage medium of claim 13, wherein the application program is operative to permit the editing of the document in one of a plurality of enabled languages, wherein the list of actions comprises at least one of the actions to convert the number to text expressed in one of a plurality of languages, and wherein generating a converted number comprises converting the number expressed using digits to the same number expressed as text in the language identified by the selected action.

15. The computer-readable storage medium of claim 14, wherein the list of actions comprises a dropdown menu having at least one menu item corresponding to the list of actions that may be performed on the number to convert the number to a number expressed as text in one of a plurality of languages.

16. The computer-readable storage medium of claim 15, wherein the set of instructions further comprising:
   determining a current user interface language setting for the application program; and
   generating the menu items of the dropdown menu in a language specified by the current user interface language setting.

17. The computer-readable storage medium of claim 16, wherein the set of instructions further comprising:
   identifying the enabled languages for the application program; and
   generating menu items of the dropdown menu only for conversion to text in the enabled languages.

18. The computer-readable storage medium of claim 10, wherein determining whether a string of text within the document includes a number expressed as digit shapes comprises:
   recognizing a particular text string as the number expressed as digit shapes;
   labeling the recognized text string with semantic labeling by associating the string of text with a text and a label of a plurality of semantic categories in the header of the electronic document in XML that identifies the number and whether the number is to be handled as one of: a decimal number, an integer number, and as both a decimal number and an integer number;
   sending information identifying the recognized string and the semantic labeling to the application program; and
   using the application program to display the list of actions generated in response to the semantic labeling applied to the recognized string.

19. The computer-readable storage medium of claim 18, wherein generating and displaying to the user a list of actions comprises:
   determining from the semantic labeling of the recognized text string the possible actions available for converting the number expressed as digit shapes; and
   generating the list of actions for display in the user interface based on the possible actions determined by the semantic information.

20. The computer-readable storage medium of claim 10, wherein displaying the number and the list of actions in a user interface take place in a user interface associated with the application program.

* * * * *